(12) United States Patent
Rubin

(10) Patent No.: US 10,628,440 B1
(45) Date of Patent: Apr. 21, 2020

(54) RANDOMIZATION VIA DYNAMIC REPRESENTATION AND INFORMED SEARCH

(71) Applicant: THE UNITED STATES OF AMERICA AS REPRESENTED BY THE SECRETARY OF THE NAVY, San Diego, CA (US)

(72) Inventor: Stuart H. Rubin, San Diego, CA (US)

(73) Assignee: United States of America as represented by Secretary of the Navy, Washington, DC (US)

( * ) Notice: Subject to any disclaimer, the term of this patent is extended or adjusted under 35 U.S.C. 154(b) by 679 days.

(21) Appl. No.: 15/214,763

(22) Filed: Jul. 20, 2016

Related U.S. Application Data

(60) Provisional application No. 62/201,682, filed on Aug. 6, 2015.

(51) Int. Cl.
| | | |
|---|---|---|
| G06F 16/30 | (2019.01) | |
| G06F 16/25 | (2019.01) | |
| G06N 7/00 | (2006.01) | |
| G06F 16/26 | (2019.01) | |

(52) U.S. Cl.
CPC ............ *G06F 16/258* (2019.01); *G06F 16/26* (2019.01); *G06N 7/005* (2013.01)

(58) Field of Classification Search
CPC ................................................ G06F 17/30569
USPC .......................................................... 707/690
See application file for complete search history.

(56) References Cited

U.S. PATENT DOCUMENTS

| | | |
|---|---|---|
| 7,047,226 B2 | 5/2006 | Rubin |
| 8,073,804 B1 | 12/2011 | Rubin |
| 8,117,147 B1 | 2/2012 | Rubin |
| 8,250,022 B1 | 8/2012 | Rubin |
| 8,280,831 B1 | 10/2012 | Rubin |
| 8,285,728 B1 | 10/2012 | Rubin |

(Continued)

OTHER PUBLICATIONS

Rubin, Stuart H., "On Randomization and Discovery", Journal of Informational Sciences, vol. 177, issue 1, pp. 170-191, Jan. 2007.
Rubin, Stuart H., "Computing With Words", IEEE Transactions on Systems, Man, and Cybernetics—Part B: Cybernetics, vol. 29, No. 4, pp. 518-524, Aug. 1999.

(Continued)

*Primary Examiner* — Irete F Ehichioya
*Assistant Examiner* — Johnese T Johnson
(74) *Attorney, Agent, or Firm* — Naval Information Warfare Center Pacific; Kyle Eppele; James R. McGee

(57) ABSTRACT

A method involves providing an information base comprising a plurality of domain-specific segments, each segment comprising a case base having cases therein and a transform base having transforms therein. Each case comprises a case antecedent and a case consequent. One or more cases are associated with one or more of transforms within the respective segment. A contextual situation falling within one of the domain-specific segments is then received and it is determined that the received contextual situation does not match the case antecedent of any of the cases within the particular domain-specific segment. One or more transforms are applied to one or more cases within the segment to create a transformed case. The transformed case has a case antecedent that matches the contextual situation and a case consequent. The case consequent of the transformed case is displayed to a user and the transformed case is stored in the case base.

20 Claims, 7 Drawing Sheets

(56) References Cited

U.S. PATENT DOCUMENTS

| | | |
|---|---|---|
| 8,315,958 B1 | 11/2012 | Rubin |
| 8,447,720 B1 | 5/2013 | Rubin |
| 8,457,795 B1 | 6/2013 | Rubin |
| 8,489,648 B1 | 7/2013 | Rubin |
| 8,655,799 B1 | 2/2014 | Rubin |
| 8,768,869 B1 | 7/2014 | Rubin |
| 8,780,195 B1 | 7/2014 | Rubin |
| 8,862,621 B1 | 10/2014 | Rubin |
| 8,955,325 B1 | 2/2015 | Rubin |
| 9,299,025 B1 | 3/2016 | Rubin |
| 9,330,358 B1 | 5/2016 | Rubin |
| 9,396,441 B1 | 7/2016 | Rubin |
| 9,436,912 B1 | 9/2016 | Rubin |
| 9,449,280 B2 | 9/2016 | Rubin |
| 9,471,885 B1 * | 10/2016 | Rubin ............... G06N 5/025 |

OTHER PUBLICATIONS

Rubin, S.H., Murthy, S.N.J., Smith, N.H., and Trajkovic, L., "KASER: Knowledge Amplification by Structured Expert Randomization," IEEE Transactions on Systems, Man, and Cybernetics—Part B: Cybernetics, vol. 34, No. 6, pp. 2317-2329, Dec. 2004.

Chaitin, G.J., "Randomness and Mathematical Proof," Sci. Amer., vol. 232, No. 5, pp. 47-52, 1975.

Rubin, Stuart H., Chen, S., and Shyu, M., "Field Effect Natural Language Semantic Mapping", IEEE International Conference on Systems, Man, and Cybernetics, vol. 3, pp. 2483-2487, Oct. 5-8, 2003.

Rubin, Stuart H., et al. "On the role of informed search in veristic computing", 2001 IEEE International Conference on Systems, Man, and Cybernetics, IEEE, Aug. 2002.

Rubin, Stuart H., et al., "Knowledge acquisition from corresponding domain knowlege transformations", IEEE International Conference on Information Reuse and Integration, IEEE, Aug. 2009.

* cited by examiner

RANDOMIZATION VIA DYNAMIC REPRESENTATION AND INFORMED SEARCH

CROSS-REFERENCE TO RELATED APPLICATIONS

This application claims the benefit of U.S. Provisional Patent Application Ser. No. 62/201,682 filed Aug. 6, 2015, entitled "Randomization Via Dynamic Representation and Informed Search", the content of which is fully incorporated by reference herein.

FEDERALLY SPONSORED RESEARCH AND DEVELOPMENT

Randomization Via Dynamic Representation and Informed Search is assigned to the United States Government and is available for licensing for commercial purposes. Licensing and technical inquiries may be directed to the Office of Research and Technical Applications, Space and Naval Warfare Systems Center, Pacific, Code 72120, San Diego, Calif., 92152; voice (619) 553-2778; email ssc_pac_T2@navy.mil. Reference Navy Case No. 103231.

BACKGROUND

There exists a need for a system and method for how to represent and apply knowledge to best facilitate its extension and use in problem solving.

DETAILED DESCRIPTION OF SOME EMBODIMENTS

Figure 1:
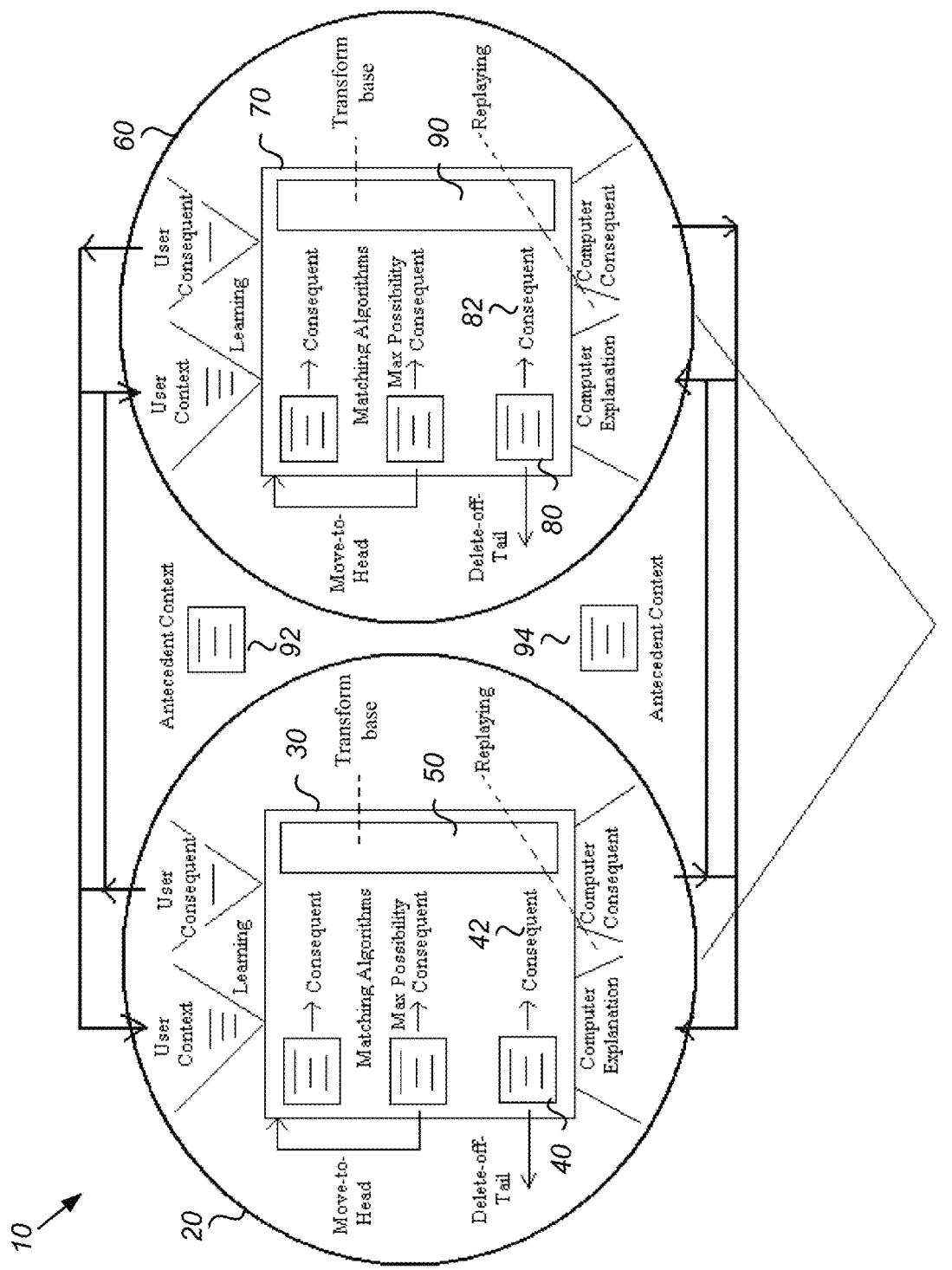
FIG. 1 shows a block diagram of the operation of one embodiment of a system in accordance with the Randomization Via Dynamic Representation and Informed Search.

Reference in the specification to "one embodiment" or to "an embodiment" means that a particular feature, structure, or characteristic described in connection with the embodiments is included in at least one embodiment of the invention. The appearances of the phrase "in one embodiment" in various places in the specification are not necessarily all referring to the same embodiment.

Some portions of the detailed description that follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities.

Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Further, it is also convenient at times, to refer to certain arrangements of steps requiring physical manipulations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "determining" or the like, refer to the action and processes of a computer system, or similar electronic computing device, that manipulates and transforms data represented as physical (electronic) quantities within the computer system memories or registers or other such information storage, transmission or display devices.

Certain aspects of the disclosed embodiments include process steps and instructions described herein in the form of an algorithm. It should be noted that the process steps and instructions of the embodiments could be embodied in software, firmware or hardware, and when embodied in software, could be downloaded to reside on and be operated from different platforms used by a variety of operating systems. Different parts of the algorithm could be embodied in different elements of hardware or software, for example, as in a distributed system.

The subject matter discussed herein pertains to a system and method that enable autonomous generalization and knowledge extension in a case-based reasoning system, which, among other benefits, will enable the construction of scalable decision-support systems capable of common-sense reasoning.

A main problem addressed by the disclosed embodiments pertains to how to represent and apply knowledge to best facilitate its extension and use in problem solving. Unlike deductive logics (e.g., the predicate calculus), an inherent degree of error is allowed for so as to greatly enlarge the inferential space. This allowance, in turn, implies the application of heuristics (e.g., multiple analogies) to problem solving as well as their indirect use in inferring the heuristics themselves. This proposal is motivated by the science of inductive inference. Examples of state-space search, linguistic applications, and a focus methodology for generating novel knowledge for wartime engagement (WAMS) are provided.

Referring now to FIG. 1, FIG. 1 shows a block diagram of one embodiment of a system 10 that may be used in accordance with the methods described herein. System 10 may include a first computing system 20 and a second computing system 60. System 10 is shown in a networked, multi-processor, distributed computing configuration. It should be recognized that system 10 may include substantially more networked computing systems 20 and 60 than those shown in FIG. 1. Additional computing systems allow for increased learning as system 10 scales upward.

Computing systems 20 and 60 may be substantially similar, and may be configured with the appropriate software modules to perform methods as discussed herein. The term "module" generally refers to a software module. A module may be implemented as a collection of routines and data structures that performs particular tasks or implements a particular abstract data type. Modules generally are composed of two parts. First, a software module may list the constants, data types, variables, and routines that may be accessed by other modules or routines. Second, a module may be configured as an implementation, which may be private (i.e., accessible only to the module), and which contains the source code that actually implements the routines or subroutines upon which the module is based. Thus, the use of the term "module" herein, indicates reference to such software modules or implementations thereof. The terms "module" and "software module" can be utilized interchangeably with one another to describe the same element or feature.

The embodiments described herein may be implemented as a series of modules, either functioning alone or in concert with physical electronic and computer hardware devices. Such modules may be utilized separately and/or together locally and/or remotely to form a program product thereof, that may be implemented through signal-bearing media, including transmission media and recordable media. The methods described herein may be implemented as a program product comprised of a plurality of such modules, which can be interactively displayed for a user on a display screen of a data-processing system (e.g., computer). Such interactivity may be provided by a specialized graphical user interface (not shown).

System 20 may include a case base system 30 including a plurality of cases having one or more antecedents 40 and one or more associated consequents 42. Antecedents 40 may be comprised of one or more independent variables that include Boolean and non-Boolean variables. System 30 may further include a transform base 50. The cases and transform base 50 may be stored in memory within computing system 20. Similarly, system 60 may include a case base system 70 including a plurality of cases having one or more antecedents 80 and one or more associated consequents 82. Consequents 82 may comprise a domain specific dependency variable. System 70 may further include a transform base 90. The cases and transform base 90 may be stored in memory within computing system 70.

In operation, user-supplied contexts are input into case base systems 20 and/or 60. The user-supplied contexts may comprise one or more contextual antecedents, such as contextual antecedents 92 and 94, which are compared to the one or more case antecedents, such as 40 or 80, which are stored in the case base.

The cases stored in the case base include case antecedents and case consequents, both of which are previously supplied by a user, either during training of the system or during real-time system operation. A case involving the best match of the case antecedents with the contextual antecedents is then determined. The consequent of the selected case is then displayed to a user, and, if the displayed consequent is not a question, the selected case is moved to the head of the case base, as indicated in FIG. 1. In the event memory constraints occur, least-frequently-used cases are deleted from the tail of the case base, as indicated (or moved to a backup secondary memory device such as an optical jukebox). In some embodiments, in a training mode, the system may display, in addition to the case consequent(s) an explanation of the case antecedent(s) that were matched with the contextual antecedent(s) supplied by the user.

Some general rules that may be implemented into the system and method disclosed herein may include: 1) cases may be learned if the user agrees with the consequent or not—so long as they do not duplicate an existing case, in which case the existing case is simply moved to the head of the queue; 2) cases are moved to the head of the queue so that the most-recently referenced case will break any ties among cases having the same computed possibility and so that the least-recently referenced cases will fall to the tail where they may be expunged with minimal functional loss; 3) consequents that ask a question however are not moved to the head because they are not as valuable as regular cases when (if) case memory fills up; and 4) consequents may be specified as "unknown" for consideration for subsequent specification (or not), when they may become known.

Figure 2:
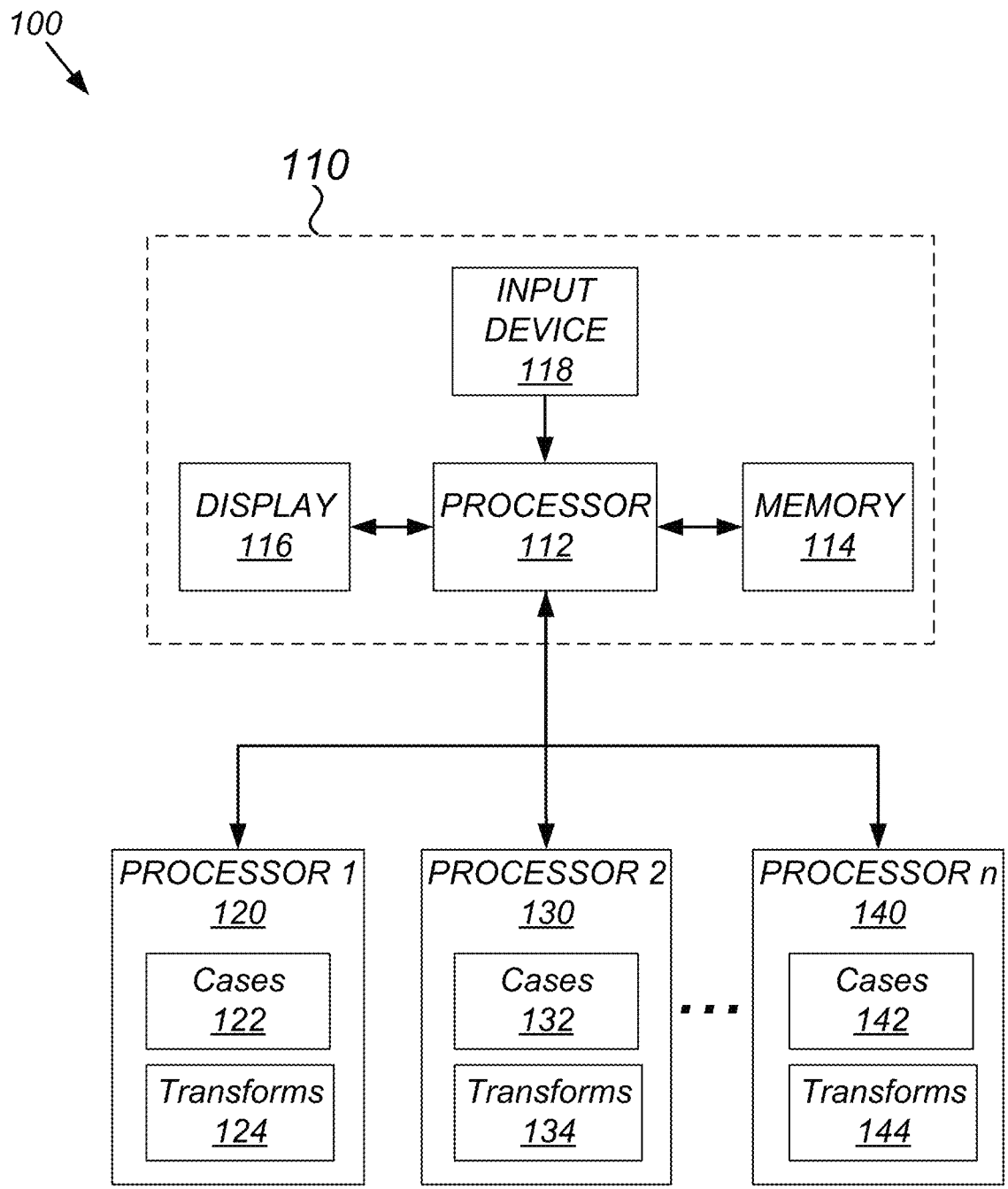
FIG. 2 shows a block diagram of an embodiment of a distributed processor system for implementing and performing a method in accordance with the disclosed embodiments.

FIG. 2 shows a block diagram of an embodiment of a distributed processor system 100 in accordance with the methods disclosed herein. The speed of a case-based reasoning system can be increased through the use of associative memory and/or parallel (distributed) processors, such as shown in FIG. 2. Furthermore, an increase in speed can be obtained if information stores are subdivided for the case knowledge by domain for threaded parallel processing. This is known as segmenting the domain. Such segmentation can be automatically managed by inferred symbolic heuristics, but this will necessarily introduce much redundancy into the system—albeit brain-like. The idea here is to match the candidate case to be acquired against the dynamic case residing at the head of each segment. This case is acquired by those segments, whose head most-closely (not perfectly) matches it based on their possibilities.

Moreover, it is acquired by all segments whose current head is within $\delta$ of this new case, where $\delta$ is dynamically defined by the minimal possibility differential among case-base heads. However, whenever the computed possibility between the new case and the case-base heads is greater than the current maximum among case-base heads, $\delta$, so that the new case falls outside of existing segments, the case is acquired by creating a new segment (i.e., given sufficient parallel nodes/space)—otherwise, the least-recently—used (LRU) segment is expunged and replaced. Thus, a system, such as system 10 or 100, may be cold-started with a pair of non-redundant segments.

Further, given a system such as system 100, it is possible for one or more computers to chat back and forth with each other if the output of each can serve to augment the input for another. This process is also brain-like because here the cases will acquire knowledge on how to solve a problem (e.g., by way of asking questions)—not just domain-specific knowledge. This respects the mathematical process of randomization. Every consequent (or response to a consequent) may be either terminal or non-monotonic in its action—as determined by whether or not it elicits additional knowledge from the user (or other subsystem) to augment the on-going context. The consequent(s) produced by this iterative feedback process may be corrected, as necessary. This is knowledge amplification because knowledge begets knowledge. That is, knowledge imbued along one path of reasoning becomes subsumed along other paths of reasoning.

Feedback may play a role in the operation of the methods described herein. Feedback takes two forms: 1) consequents may raise questions, the answers to which, supplied by the users, server to augment the context; and 2) the consequents themselves may literally augment the context—again, under user control. The fact that antecedents and consequents can share the same space implies that words for both share the same words table.

Classical set theory does not allow for duplication of elements in the context or antecedent. However, sentential forms are sequence sensitive and thus differ from sets. For example, if I state, "location", you might think of a map; but, if I state, "location, location, location", you might instead think of real estate. Our system must be capable of making use of such sequence in matters of practical feedback. However, contextual duplicate words may not be counted because to do so would proportionately decrease the resultant possibility and thus result in a bad case match. Fortunately, not counting duplicates does not change the complexity of the algorithm. The context length is decreased by one for each such duplicate (i.e., when in default mode). Then, notice that traditionally deleterious cycles (e.g., a→a; a→b, b→a; etc.) become an asset because with the aforementioned feedback comes duplication in the context, which as we've witnessed can beneficially alter sentential semantics. This means that there is no need to hash to detect cycles (using stacked contexts) because such cycles are beneficial. Finally, the allowance for cycles implies that there is no need to copy the context into a buffer to facilitate data entry.

As such, system 100 may include a computer 110 having processors 120, 130, and 140 connected thereto. Computer 110 may include a processor 112, memory 114, display 116, and input device 118, such as a keyboard or mouse. System 100 may be used to provide an increase in computing capacity by allowing processor 112 to coordinate processors 120, 130, and 140 such that maximum processing capabilities are achieved. Processors 120, 130, and 140 may each represent different domain-specific segments of a case-based system. As an example, if the case-based system involved prediction of sports injuries, one domain segment may involve baseball, one domain segment may involve basketball, one domain segment may involve football, and so forth, with a separate processor being used for each domain-specific segment. In such embodiments, processor 120 contains a case base 122 and a transform base 124, processor 130 contains a case base 132 and a transform base 134, and processor 140 contains a case base 142 and a transform base 144. However, in some embodiments, one processor may be used to store and process all domain-specific segments.

Figure 3:
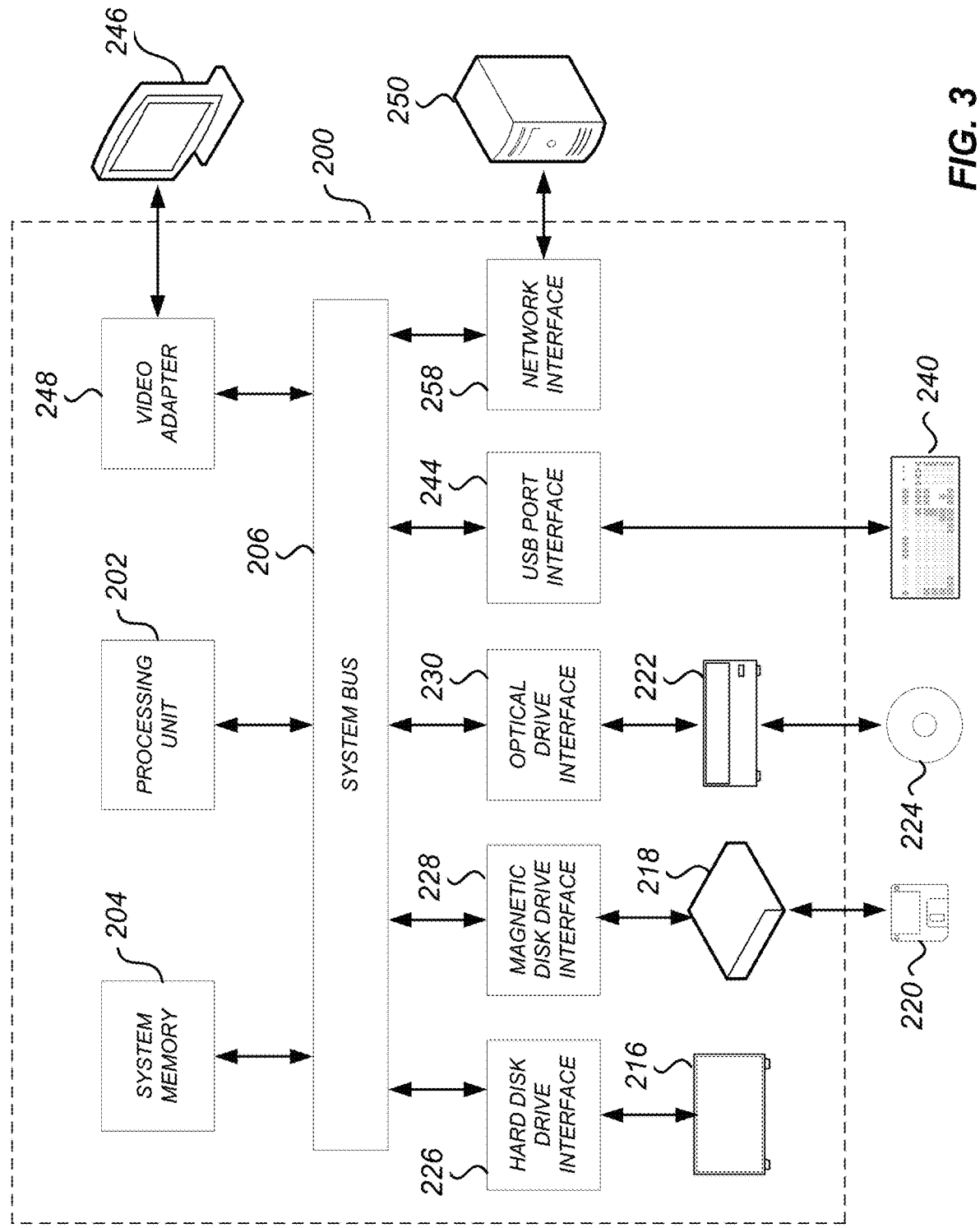
FIG. 3 shows a block diagram of an embodiment of a computing system for implementing and performing a method in accordance with the disclosed embodiments.

FIG. 3 shows a block diagram of an embodiment of a computing system that may be used to implement a method in accordance with the methods disclosed herein. FIG. 3 and the following description are intended to provide a brief, general description of a suitable computing environment in which an embodiment of the method discussed herein may be implemented. Although not required, the method will be described in the general context of computer-executable instructions, such as program modules, being executed by a personal computer.

Moreover, those skilled in the art will appreciate that embodiments of the method may be practiced with other computer system configurations, including hand-held devices, multiprocessor systems, microprocessor-based or programmable consumer electronics, networked personal computers, minicomputers, mainframe computers, and the like. Embodiments of the method may also be practiced in distributed computing environments where tasks are performed by remote processing devices that are linked through a communications network (such as shown in FIG. 2). In a distributed computing environment, program modules may be located on both local and remote memory storage devices.

System 200 may include a general-purpose computing device in the form of a conventional personal computer 200, which includes processing unit 202, system memory 204, and system bus 206 that operatively couple various system components to other system components (e.g., system bus 206 operatively couples system memory 204 to processing unit 202). Examples of system bus 206 include a memory bus, memory bus controller, peripheral bus and local bus using any of a variety of known bus structures. System memory 204 may include read only memory, random access memory, and a basic input/output system.

System 200 further includes hard disk drive 216 for reading from and writing to a hard disk (not shown) a magnetic disk drive 218 for reading from or writing to a removable magnetic disk 220 (e.g., 4.5-inch disk), and an optical disk drive 222 for reading from and writing to a removable optical disk 224 (e.g., CD-ROM and DVD). Hard disk drive 216, magnetic disk drive 218 and optical disk drive 222 are operatively connected to system bus 206 via hard disk drive interface 226, magnetic disk drive interface 228 and optical drive interface 230, respectively. The drives and their associated computer-readable media provide non-volatile storage of computer readable instructions, information structures, program modules and other information for personal computer 200.

The method steps of embodiments may be stored on a hard disk, magnetic disk 220, and optical disk 224. Although the exemplary environment described herein employs a hard disk, magnetic disk 220 and optical disk 224, it should be appreciated by those skilled in the art that other types of computer readable media that may store information accessible by a computer, (e.g., magnetic cassettes, flash memory cards, digital video disks, Bernoulli cartridges, random access memories (RAMs), and read only memories (ROMs)) may also be used in the exemplary operating environment without departing from the scope or spirit of embodiments of the method.

A user may enter commands and information into personal computer 200 via input devices such as keyboard 240 and pointing devices (e.g., mouse and trackball) (not shown in FIG. 3). Examples of input devices include a microphone, joystick, game pad, and satellite dish. Input devices may be operatively connected to processing unit 202 via universal serial bus (USB) port interface 244 that is operatively connected to system bus 206. Input devices may also be operatively connected to processing unit 202 via other interfaces (e.g., parallel port, serial port and game port) that are operatively connected to system bus 206. Monitor 246 is operatively connected to system bus 206 via video adapter 248.

Other peripheral devices (e.g., speakers and printers) may be operatively connected to system 200 via other interfaces. System 200 may operate in a networked environment using logical connections to one or more remote computers such as remote computer 250 via network a network, such as a local area network, wide area network, and wireless network. Examples of remote computer 250 include a personal computer, server, router, networked personal computer, peer device, and network node.

Now pertaining to the methodology, consider the following problem, where the assigned task is the lossless randomization of a sequence of integers. Note that a slightly more complex (real-world) task would be to randomize a similar sequence of integers, where the error-metric need not be zero, but is always bounded. Such sequences arise in the need for all manner of prediction (e.g., from the path of an incoming missile to the movement of storm tracks, et al.).

| Randomize | n: | 0 | 0 | 1 | 4 | 11 | 26 | 57 |
|-----------|----|---|---|---|---|----|----|----|
|           | i: | 0 | 1 | 2 | 3 | 4  | 5  | 6  |

A randomization is given here by n (i+1)←2n (i)+i. We say that this randomization is lossless because the associated error-metric (e.g., the 2-norm) is zero. Randomizations may or may not exist given the operator, operand set, and the set error-metric bounds. Furthermore, even in cases where randomizations exist, they may not be discoverable in the allocated search time on a particular processor(s). In view of this, the general problem of randomization is inherently heuristic.

Clearly, there is no logic that can solve the inductive inference problem. Rather, one needs to define a search space such that the search operators are informed. The more informed the search operators, the less search that is required (i.e., successful or not). Here is one possible schema to delimit the search space in this problem:

n (i+1)←M {*, /, +, −, **} n (i) {*, /, +, −} {i, n (i−1)}

Partially assigning mnemonics, this schema can be described as follows.

n (i+1)←int extended-ops n (i) ops {i, n (i−1)}

But, even here, it is apparently ambiguous as to how such a schema might be found. To answer this question, consider the randomization of the even sequence, 2n, and the odd sequence, 2n+1.

The randomization of these two sequence definitions is given by 2n+j, j∈{0, 1}. Next, note that "+" ⊂ ops ⊂ extended-ops. Each replacement, at the right, represents a level of generalization. Generalizations are not made—except to randomize two or more instances. For example, if the odd sequence were defined by 2n−1, then a first-level randomization (i.e., based on the given mnemonics) of 2n+1 and 2n−1 is given by 2n ops 1. Clearly, having multiple mnemonics can greatly enlarge the search space and result in intractable solutions. An evolutionary approach to reducing the implied search time is to perform a gradient search outward from known valid points. Here, search reduction is obtained by commensurately reducing search diversity. It is claimed that this process is what enables most of us to solve inferential randomization problems such as this one, most of the time. The dual constraints of available search time vs. the generality of the candidate solution space serves to dynamically contract or expand the search space.

Notice that the process of randomization not only captures existing instances in a more compact form, but in so doing embodies similar instances, which may or may not be valid. The point is that by limiting the degree of generalization, one tightens the degree of analogy and in so doing, increases the chance of a valid inference. The inferences found to be valid are fed back to the randomization process. This results in a more delimited search space—increasing the subsequent chance for valid inferences. Moreover, the inference of grammars more general than regular grammars is inherently heuristic. The context-free grammar (CFG) is the lowest-level such grammar. All non-deterministic grammars may be statistically augmented—resulting in stochastic grammars. Furthermore, where heuristics serve in the generation of new knowledge and that knowledge serves in the generation of new heuristics, the amplification of knowledge occurs by way of self-reference. Allowing for the (self-referential) application of knowledge bases, any methodology serving in the discovery of these heuristics must be domain-general. Transformative search for randomization is the most general such methodology because it extracts self-referential knowledge from situational as well as action knowledge in context.

Next, a defining example of representational randomization is provided. Here, phrase structure (i.e., Type 0) grammatical inference will be applied to induce novel case knowledge. The number of derivational paths, necessarily including the time for derivation, provides a heuristic estimate of the derivational error (FIG. 1). Higher-level descriptive mnemonics are acquired through usage—eliminating the need for query here. Such query does not work well in general because most associations are novel and hierarchical (i.e., not colloquial).

The more constrained the search for knowledge, not only the faster that knowledge may be induced, but the faster heuristics aiding in the induction of that knowledge may be obtained as well. This knowledge may appear to be rules, but it is actually cases. This is because rule applications may be chained, which prevents immediate feedback on their validity. On the other hand, validity can always be ascertained after a single case application. Also, for this reason, case bases are easier to maintain and can be grown far larger.

Figure 4:
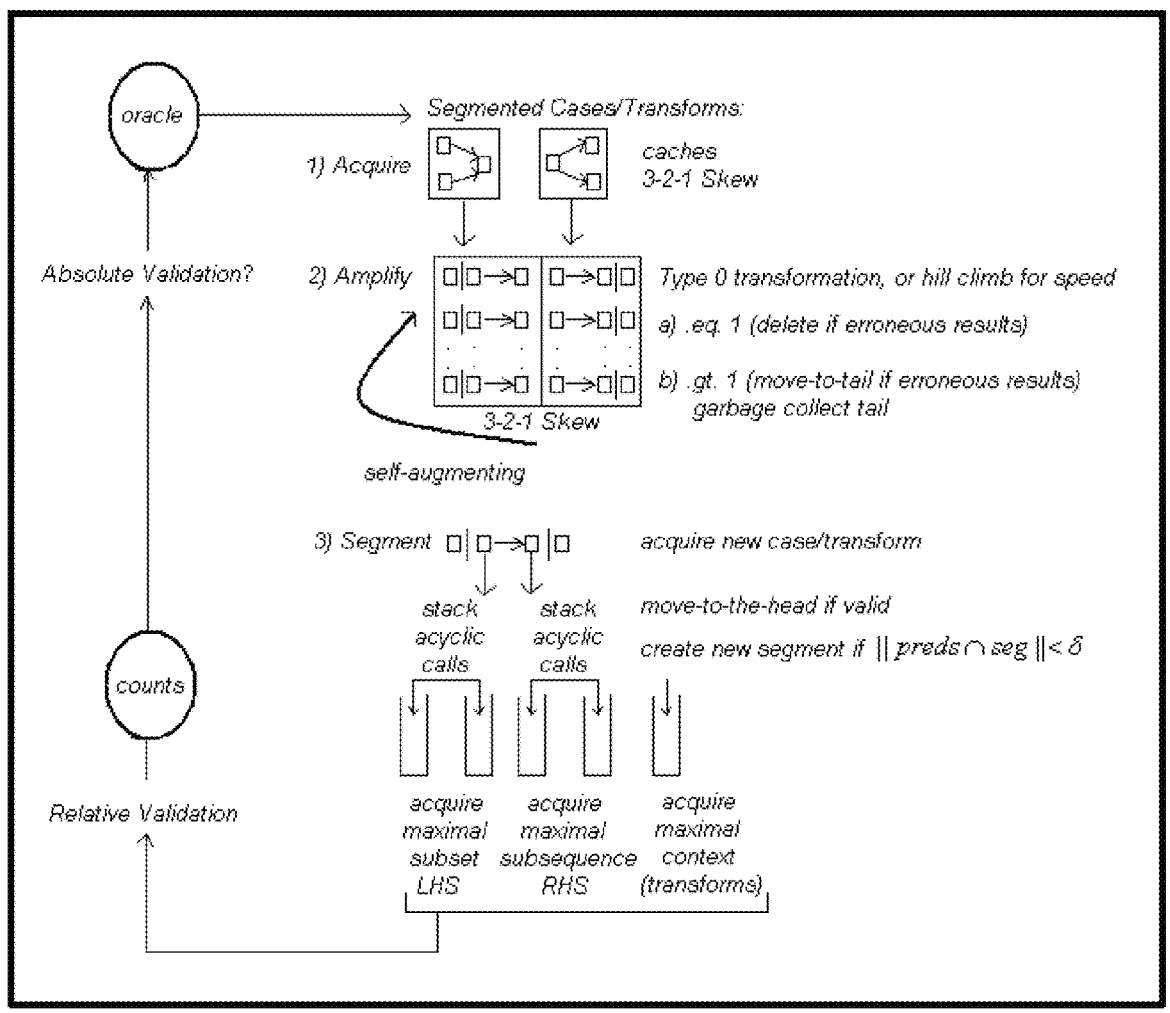
FIG. 4 shows a diagram illustrating a dynamic representation for knowledge inference in accordance with the disclosed embodiments.

Derivational paths are characterized as transformational sequences for the synthesis of individual cases. Situations and/or actions may be transformed to create a candidate case. Cases found to be in error are deleted from their containing grammatical segment(s). Only chains of length one may be deleted if an erroneous case should result. When longer transformational chains are used and result in an erroneous case, the involved transforms are logically moved-to-the-tail of their segment in their order of application. Thus, these transforms will be among the first to fall off of their tails when space is reclaimed. Convergence upon correct cases and thus correct transforms is assured. This methodology for knowledge inference is depicted in diagram 300 shown in FIG. 4.

The attainable degree of randomization, the resultant validity of the embodied cases, and the rapidity of discovery will always be greater if the domain is segmented to facilitate parallel processing. Segmentation also reduces the need for superfluous comparison operations, which insures that they will be tractable. Of course, one segment can refer to another if care is exercised to avoid daisy chaining. This may be accomplished through the use of a non-redundant stack of generated calls. The assignment of segments itself may properly be under case-based control.

The invocation of distinct segments for (partial) left-hand side (LHS) and/or right-hand side (RHS) predicates maximizes the reuse of case-based/transform knowledge. This is a primary tenet of randomization theory. Thus, case/transform LHSs and/or RHSs may iteratively call segments using subsets of LHS contexts. Potential cycles are readily managed by the LHS case/transform predicates themselves. For example, a segment for predicting what crops to sow will no doubt invoke a segment for predicting the weather. Similarly, a segment for planning a vacation will likewise invoke a segment for predicting the weather (i.e., reuse).

A grammatical segment is defined to be domain specific. Segments are divided into two parts—that for the LHS and that for the RHS. The LHS consists of sets and the RHS consists of sequences—for cases and their transformations alike. Segments acquire cases having maximal intersection (LHS sets) or commonality (RHS subsequences). These metrics are normalized for the number of entries in the segment to insure compatibility. Each case/transformation is stored twice. New segments are created if there is no intersection or commonality. Setting the intersection threshold to zero will result in relatively few large segments;

whereas, setting it too high will result in relatively many small segments. The former condition will be relatively slow, capture too many analogies, and result in excessive errors; while, the latter condition will be relatively fast, not capture enough analogies, and result in too little creativity. Thus, the intersection threshold may be dynamically adjusted for a given domain. Referenced segments are logically moved to the head of a containing list. Unreferenced segments are subject to tail deletion. Cases/transforms may be cached for maximal speed of retrieval. There are two basic types of class equivalence, introduced by Rubin, and made realizable by the embodiments disclosed herein. Here, { } denotes sets, while ( ) denotes phrase sequences.

1. Case pairs of the form: A→C; B→C. This implies that {A, B} may be substituted for one another as conditional predicates, where C is a subsequence or a supersequence of a RHS immediately implied by the substitution. Substitutions are initially hill-climbed (i.e., non-contracting transformations—getting closer to a match with each substitution), given a matching action subsequence or super-sequence, to most rapidly enable a situation to be covered by a supplied context. Upon failure of such search, substitutions are made in random order, until interrupt, to enable Type 0 generality. The first most-specific case situation to be covered, and/or having the most instances of derivation, is selected. This metric is inherently heuristic.

2. Non deterministic case pairs of the form: A→C; A→D. This implies that (C D) may be substituted for one another as non-deterministic actions, where A is a subset or a superset of a LHS immediately implied by the substitution. Substitutions are initially hill-climbed, given a matching situational subset or super-set, to most rapidly enable a (partial) action substitution. Upon failure of such search, substitutions are made in random order, until interrupt, to enable Type 0 generality. The first most-specific transformation to be applied, and/or having the most instances of derivation, is selected. This metric is inherently heuristic.

Consider the following case-based knowledge segment. The use of frames will be elaborated upon at a subsequent point so as not to obscure the basic concepts.

C1: {A, B, C}→(X)
C2: {A, E}→(X)
C3: {B, D}→(X)
C4: {A, B, C}→(Y)

Clearly, C1 and C4 are non-deterministic. Moreover, C1, C2, and C3 are conceptually (i.e., if not literally) equivalent in the context of the RHS, X. Case pairings are made on the basis of the most-recently fired first. Such pairings are made using the 3-2-1 skew (see FIG. 6) to favor the just in time induction of new cases in a domain that has shown itself to be most-recently needed. Also, the acquisition of new cases leads to the acquisition of new transforms. Note that if the system sits idle for long, it enters dream mode via the 3-2-1 skew. That is, it progressively incorporates less recently acquired/fired cases.

Where our case-based segment reflects a logical move-to-the-front ordering, C1 and C2 are most-likely paired. This induces a context-sensitive case (i.e., which is also limited in applicability to the segment from which it was derived) for the transformation of LHS representations as follows.

T1 [C1, C2]: {A, B, C}→{A, E}|(X)

Next, consider the acquisition of a fifth valid case:
C5: {A, B, C, D}→(Z), where X∈Z, or Z∈X, read as subsequence. The mean probability of validity, for the inferred case, is given by $$\frac{\max(|X| \mid X \in Z, |Z| \mid Z \in X)}{\max(|X|, |Z|)}.$$

Applying T1 yields:
C6=T1 [C5]: {A, D, E}→(Z)

If C6 is validated, T1 is moved to the logical head of a validated LHS transformational segment. Otherwise, T1 and C6 are deleted. Notice that the acquisition of C6 may result in an iterative propagation of synthesized cases and associated acquisitions. It is important to provide for immediate feedback from a single case to squelch such possible explosions of bad knowledge. Moreover, suppose the LHS transformational segment includes T2 as follows.

T2 [, C2]:{A, D}↔{A, E}|(W), where X∈W, or W∈X. The mean probability of validity, for the inferred case, is given by $$\frac{\max(|X| \mid X \in W, |W| \mid W \in X)}{\max(|X|, |W|)}.$$

Applying T2 to T1 induces the further transformational case:
T3 [C1,]: {A, B, C}↔{A, D}|(X|X∈W,W|W∈X)

Transformations are adjudicated as soon as feedback can be had on the validity of an induced case. Furthermore, the synthesis of redundant cases serves to provide predictive evidence of validity. Distinct case pairings are selected at random, where the selection space is gradually increased downward, using the segmented list head (see Appendix I). Again, this tends to favor the synthesis of knowledge in proportion to its recent utility. Transformations, like cases, are logically moved within their segment when acquired (i.e., at the head) or fired.

Suppose that C1 and C4 are the next cases to be paired. This induces a segment-specific context-sensitive case for the transformation of the RHS representations as follows.

T4 [C1, C4]: (X)↔(Y)|{A, B, C} The mean probability of validity, for the inferred case, is given by $$\frac{|\{A, B, C\} \cap \{A, B, C\}|}{|\{A, B, C\} \cup \{A, B, C\}|} = 1.0.$$

Next, consider the acquisition of a seventh valid case:
C7: {A, C}→(Y Z), where {A, C}⊆{A, B, C} (or vice versa), where this is read as subsets.

The mean probability of validity, for the inferred case, is given by $$\frac{|\{A, C\} \cap \{A, B, C\}|}{|\{A, C\} \cup \{A, B, C\}|} = 0.67.$$

Applying T4 to C7 yields:
C8=T4 [C7]: {A, C}→(X Z) with stochastic probability of 1.0 (the probability for T4)*0.67 (the probability for C7)=0.67

Similarly, the joint probability of LHS and RHS transformations is multiplicative. If C8 is validated, T4 is moved to the logical head of the appropriate validated RHS transformational segment. Otherwise, T4 and C8 are deleted.

Notice that the acquisition of C8 may result in an iterative propagation of symmetric cases and associated acquisitions. It is again important to provide for immediate feedback from a single case to squelch such possible explosions of bad knowledge. Moreover, suppose the RHS transformational segment includes T5 as follows, where Q is the LHS of whatever the (resultant) transform is applied to (i.e., transform or case).

T5 [, C4]: (W)↔(Y)|{A, B, C}, where Q⊆{A, B, C}, or {A, B, C}⊆Q. The mean probability of validity, for the inferred case, is given by $$\frac{|Q \cap \{A, B, C\}|}{|Q \cup \{A, B, C\}|}.$$

Applying T4 to T5 induces the further transformational case: T6 [C1,]: (W)↔(X)|{A, B, C}, where Q⊆{A, B, C}, or {A, B, C}⊆Q. The mean probability of validity, for the inferred case, is given by p (T4), $$\frac{|\{A, B, C\} \cap \{A, B, C\}|}{|\{A, B, C\} \cup \{A, B, C\}|} * p(T5),$$

$$\frac{|Q \cap \{A, B, C\}|}{|Q \cup \{A, B, C\}|} = \frac{|Q \cap \{A, B, C\}|}{|Q \cup \{A, B, C\}|}.$$

The transformational cases are segmented and logically ordered to facilitate pattern matching as well as for determining the relative time of last use. Cases are selected for firing using a most-specific inference engine. Unreferenced cases, as well as cases having validated generalizations (i.e., subsumption) may drop off of the logical tail of their segments.

The process of grammatical randomization is not deterministic. Thus, if the order of randomizations is determined at chance, then distinct transformational paths may result. The relative validity of an induced case bears proportion to the number of paths by which it may be derived by transformational process. Unfortunately, there is no formula for ascertaining the probability of such derivations in an absolute sense. This is because the quality of the cases comprising transformations as well as the applicability of the transformations themselves cannot be known a priori.

Stochastic validation is ideally suited to parallel processing. It is to be used where feedback is long in coming and thus individual cases need to be tagged with a relative predictive validity. The use of stochastic validation does not preempt the need for immediate feedback because that which can be learned is limited by the availability of feedback.

Next, an example of a state-space prediction for autonomic computing will be discussed. The task of this example is to show how randomization can be used for the abstract solution of transforming one representation of knowledge, or model, into a similar (i.e., symmetric) one. The application here is to predict a proper operator sequence, as applied to a state space, in a plan to reach a goal. Note that the methodology can supply heuristics to accelerate state-space search. The approach employed here learns similar maps, whose value (i.e., faster heuristic search) and validity converge with scale. To begin, since robot problems are simple and intuitive, examples from this domain are used to illustrate the major ideas embodied in this proposal. Programming a robot involves integrating many functions—incorporating perception, the formulation of plans of action, and monitoring the execution of these plans. Here, the problem is to synthesize a sequence of robot actions that map the robot from some initial state to some goal state.

Robot actions are modeled by a production system, where state descriptions are constructed from predicate calculus well-formed formulas (wffs). The task here is to stack three blocks (i.e., A, B, C). The formula CLEAR (B) means that block B has a clear top with no block on top of it. The ON predicate is used to describe which blocks are (directly) on other blocks. The predicate HANDEMPTY has value T just in case the robot (placement) hand is empty. The use of other predicates is similar. Suppose the initial state description has blocks A and B on the table and block C on top of block A. Further suppose that the goal state has block C on the table, block B on top of block C, and block A on top of block B. Let's begin with a common initial state (0):

(0) CLEAR (A), ONTABLE (A); CLEAR (B), ONTABLE (B); CLEAR (C), ONTABLE (C); HANDEMPTY

Next, the following two cases are acquired in the first segment.

(1) pickup (C)→CLEAR (A), CLEAR (B), HOLDING (C), ONTABLE (A), ONTABLE (B)

(1) pickup (A)→CLEAR (B), CLEAR (C), HOLDING (A), ONTABLE (B), ONTABLE (C)

The general theory has us looking to equate the LHSs here. This is possible by way of an adjustment for the use of wffs through the use of parametric fusion; although, a pair of matching LHS instances does not result, which precludes equating the LHSs here:

(1) pickup (U)→CLEAR (V), CLEAR (W), HOLDING (U), ONTABLE (V), ONTABLE (W) Similarly, (1) pickup (B) induces the instantiation:

(1) pickup (B)→CLEAR (V), CLEAR (W), HOLDING (B), ONTABLE (V), ONTABLE (W) Here, it is discovered through search that B≠V≠W and {B, V, W}={A, B, C}. Taking V=A and W=C yields:

(1) pickup (B)→CLEAR (A), CLEAR (C), HOLDING (B), ONTABLE (A), ONTABLE (C)

Next, the following five cases are acquired in the second segment.

(2) stack (B, A)→CLEAR (C), ON (B, A), CLEAR (B), ONTABLE (A), ONTABLE (C), HANDEMPTY (2) stack (C, B)→CLEAR (A), ON (C, B), CLEAR (C), ONTABLE (A), ONTABLE (B), HANDEMPTY (2) stack (C, A)→CLEAR (B), ON (C, A), CLEAR (C), ONTABLE (A), ONTABLE (B), HANDEMPTY (2) stack (A, C)→CLEAR (B), ON (A, C), CLEAR (A), ONTABLE (B), ONTABLE (C), HANDEMPTY (2) stack (A, B)→CLEAR (C), ON (A, B), CLEAR (A), ONTABLE (B), ONTABLE (C), HANDEMPTY Parametric fusion here yields (ONTABLE is commutative):

(2) stack (U, V)→CLEAR (C), ON (U, V), CLEAR (U), ONTABLE (V), ONTABLE (C), HANDEMPTY Similarly, (2) stack (B, C) induces the instantiation:

(2) stack (B, C)→CLEAR (?), ON (B, C), CLEAR (B), ONTABLE (C), ONTABLE (?), HANDEMPTY Here, it is discovered through search that?≠U≠V and {? U, V}={A, B, C}. Taking?=A yields:

(2) stack (B, C)→CLEAR (A), ON (B, C), CLEAR (B), ONTABLE (C), ONTABLE (A), HANDEMPTY Again, a pair of matching LHS instances does not result, which precludes equating the LHSs here.

Next, the following five cases are acquired in the third segment. These build on the results found in the second segment.

(3) pickup (C)→ON (B, A), CLEAR (B), HOLDING (C), ONTABLE (A)
(3) pickup (A)→ON (C, B), CLEAR (C), HOLDING (A), ONTABLE (B)
(3) pickup (B)→ON (C, A), CLEAR (C), HOLDING (B), ONTABLE (A)
(3) pickup (B)→ON (A, C), CLEAR (A), HOLDING (B), ONTABLE (C)
(3) pickup (C)→ON (A, B), CLEAR (A), HOLDING (C), ONTABLE (B)
Parametric fusion here yields:
(3) pickup (U)→ON (V, W), CLEAR (V), HOLDING (U), ONTABLE (W)
Similarly, (3) pickup (A) induces the instantiation:
(3) pickup (A)→ON (V, W), CLEAR (V), HOLDING (A), ONTABLE (W)
Here, there are two pairs of cases having common LHSs in the third segment. They are equated as follows.
ON (B, A), CLEAR (B), HOLDING (C), ONTABLE (A)→ ON (A, B), CLEAR (A), HOLDING (C), ONTABLE (B)|pickup (C)
ON (C, A), CLEAR (C), HOLDING (B), ONTABLE (A)→ ON (A, C), CLEAR (A), HOLDING (B), ONTABLE (C)|pickup (B)
These are parametrically fused, through search, as follows.
ON (U, V), CLEAR (U), HOLDING (W), ONTABLE (V)→ ON (V, U), CLEAR (V), HOLDING (W), ONTABLE (U)|pickup (W)
Instantiating A for W (satisfying the context) yields:
ON (U, V), CLEAR (U), HOLDING (A), ONTABLE (V)→ ON (V, U), CLEAR (V), HOLDING (A), ONTABLE (U)
Thus, (3) pickup (A)→ON (B, C), CLEAR (B), HOLDING (A), ONTABLE (C), where if this were not predicted valid (e.g., using multiple derivations), which it is→ON (C, B), CLEAR (C), HOLDING (A), ONTABLE (B) as a second candidate (or vice versa)

Next, the following five cases are acquired in the fourth segment. These build on the results found in the third segment.
(4) stack (C, B)→CLEAR (C), ON (C, B), ON (B, A), ONTABLE (A), HANDEMPTY
(4) stack (A, C)→CLEAR (A), ON (A, C), ON (C, B), ONTABLE (B), HANDEMPTY
(4) stack (B, C)→CLEAR (B), ON (B, C), ON (C, A), ONTABLE (A), HANDEMPTY
(4) stack (B, A)→CLEAR (B), ON (B, A), ON (A, C), ONTABLE (C), HANDEMPTY
(4) stack (C, A)→CLEAR (C), ON (C, A), ON (A, B), ONTABLE (B), HANDEMPTY
Parametric fusion here yields:
(4) stack (U, V)→CLEAR (U), ON (U, V), ON (V, W), ONTABLE (W), HANDEMPTY
Similarly, (4) stack (A, B) induces the instantiation:
(4) stack (A, B)→CLEAR (A), ON (A, B), ON (B, W), ONTABLE (W), HANDEMPTY
Here, it is discovered through search that W=C, which yields:
(4) stack (A, B)→CLEAR (A), ON (A, B), ON (B, C), ONTABLE (C), HANDEMPTY
This is readily verified to be a goal state (e.g., predicted by multiple derivations), as desired.

An example pertaining to natural language computing will now be discussed. In this section, the state-space search presented in the previous section will be replaced by an equivalent space, expressed in natural language. Natural language has the advantage in that it may be transformed for syntax (i.e., context-sensitive sequence) and/or semantics (i.e., context-free content). Syntax and semantics are used in our wartime decision support system (see below). This section will be limited to semantic transformation. Word sequences can be broken into semantics through the application of distinct domain cases. This example is intended to demonstrate the utility of transformation in natural language processing (e.g., for use in WAMS—see below). To begin, let the initial state (d0) is given by the context:
(d0) the three blocks are on the table, the three blocks are clear, the hand is empty Next, here are two cases for the first segment. These transform the initial context.
(d1) pick up the third block→clear the other two, hold the third block, the other two are on the table
(d1) pick up the first block→clear the other two, hold the first block, the other two are on the table
Suppose next that there exists a transformational segment (see above) with the following transformations.
(t1) first block↔third block pickup
(t2) first block↔nth block pickup
(t3) second block↔nth block pickup
The fact that t2 is a generalization of t1 is not critical and is handled as previously described. Also, t1 and t2 induce the first joint transformation, third block↔nth block|pickup. t2 and t3 induce the second joint transformation, first block↔second block pickup.
Applying t1, t2, t3, in sequence, or the first joint transformation to the first case in d1, or equivalently, t2, t3 to the second case in d1, or the second joint transformation (i.e., as determined by the search paradigm used) results in the predictive case:
(d1) pick up the second block→clear the other two, hold the second block, the other two are on the table
Next, here are five cases for the second segment.
(d2) put the second block on top of the first block→clear all but the lowest block in the stack, the second block is on top of the first block, blocks not on top of another block are on the table, the hand is empty
(d2) put the third block on top of the second block→clear all but the lowest block in the stack, the third block is on top of the second block, blocks not on top of another block are on the table, the hand is empty
(d2) put the third block on top of the first block→clear all but the lowest block in the stack, the third block is on top of the first block, blocks not on top of another block are on the table, the hand is empty
(d2) put the first block on top of the third block→clear all but the lowest block in the stack, the first block is on top of the third block, blocks not on top of another block are on the table, the hand is empty
(d2) put the first block on top of the second block→clear all but the lowest block in the stack, the first block is on top of the second block, blocks not on top of another block are on the table, the hand is empty
Suppose that there exists a distinct transformational segment containing the following transformation.
(t4) first block↔third block|stack
Applying t4 to the first case in d2 results in the predictive case:
(d2) put the second block on top of the third block→clear all but the lowest block in the stack, the second block is on top of the third block, blocks not on top of another block are on the table, the hand is empty
Next, here are five cases for the third segment. These build on the results found in the second segment.
(d3) pick up the third block→the second block is on top of the first block, the second block is clear, holding the third block, the first block is on the table (d3) pick up the first block→the third block is on top of the second block, the third block is clear, holding the first block, the second block is on the table
(d3) pick up the second block→the third block is on top of the first block, the third block is clear, holding the second block, the first block is on the table
(d3) pick up the second block→the first block is on top of the third block, the first block is clear, holding the second block, the third block is on the table
(d3) pick up the third block→the first block is on top of the second block, the first block is clear, holding the third block, the second block is on the table
Suppose that there exists a distinct transformational segment containing the following transformation.
(t5) first block↔third block, third block↔first block pick up the third block
Applying t5 to the first case in d3 results in the predictive case:
(d3) pick up the first block→the second block is on top of the third block, the second block is clear, holding the first block, the third block is on the table
Next, here are five cases for the fourth segment. These build on the results found in the third segment.
(d4) put the third block on top of the second block→the third block is clear, the third block is on top of the second block, the second block is on top of the first block, the first block is on the table, the hand is empty
(d4) put the first block on top of the third block→the first block is clear, the first block is on top of the third block, the third block is on top of the second block, the second block is on the table, the hand is empty
(d4) put the second block on top of the third block→the second block is clear, the second block is on top of the third block, the third block is on top of the second block, the first block is on the table, the hand is empty
(d4) put the second block on top of the first block→the second block is clear, the second block is on top of the first block, the first block is on top of the third block, the third block is on the table, the hand is empty
(d4) put the third block on top of the first block→the third block is clear, the third block is on top of the first block, the first block is on top of the second block, the second block is on the table, the hand is empty
Suppose that there exists a distinct transformational segment containing the following transformation.
(t6) first block↔third block, third block↔first block put the third block on top of the second block
Applying t6 to the first case in d4 above results in the predictive case:
(d4) put the first block on top of the second block→the first block is clear, the first block is on top of the second block, the second block is on top of the third block, the third block is on the table, the hand is empty Again, this is readily verified to be a goal state (e.g., as predicted by multiple derivations), as desired. It may appear that simple parametric substitution, as illustrated here, is the key to randomization. Thus, the question arises as to why the need for conformant LHSs and/or RHSs for knowledge amplification. The answer is that in general, equivalence transformations can be arbitrarily complex. Unless the domain is well understood, it is not possible to catalog most equivalence transformations a priori. It follows that the proposed methodology, which is knowledge-based rather than algorithmic, is needed for randomization in the general case. Furthermore, this methodology provides for a composition of transforms, which serves to extend the initial transformational space. This represents a deepest form of reuse.

An area of military concern pertains to the generation of maximally effective plans for conventional and asymmetric battles. Such plans include strategic as well as tactical components. A problem is that it is not practical to plan for every contingency. Thus, a methodology is needed, which can extract and extend the applicability of naval (wartime) knowledge to contemporary situations.

Case-Based Reasoning (CBR) has evidenced that while cases provide excellent representations for the capture and replay of military plans, the successful generalization of those plans requires far more contextual knowledge than economically sound planning will allow. For example, a generalization of gasoline is fuel. However, only a proper subset of automobiles can burn fuels other than gasoline. Knowledge of which automobiles burn what fuels is not coincidently obtained through the generalization process. In practice, this problem, which arises out of context, is referred to as, overgeneralization. Rather, the approach to randomization, proposed herein, enables the dynamic extraction of transformation cases, which permits the inference of novel cases through the application of set/sequence context—along with a relative estimate of case validity.

All cases and transforms are segmented. Supplied basis cases may be mined from actual wartime data (i.e., as opposed to military war games) and/or supplied by a military expert. The use of cases here, as opposed to rules, means that the military strategist need not know precise causality. Thus, far more basis knowledge can be supplied. The methodology will find, extract, apply, and to some level validate the causal knowledge prior to amplification. As a result, wartime decision support systems can be delivered, which strategize solutions to novel, but not totally unexpected situations as they develop. The resulting System of Systems, or Wartime Associate for Military Strategy (WAMS), amplifies existing naval knowledge for wartime engagement.

Situations and actions are given a frame format to facilitate pattern matching as well as descriptive content and are of the form:
Context-Free Category: Context-Sensitive Phrase Instance.

For example, Contact Method: shortwave radio transmission. The use of distinct frames and/or instances implies distinct cases. A transform, or a sequence of transforms, can map a case so that it is covered by a context. In what follows, Fi is frame i followed by a phrase instance. Searches specific to a segment(s) utilize segment name(s).

Inherent sequence in frames, on the LHS, may be specified through the use of join frames. For example, the frames, SOCKS-ON and SHOES-ON might include the join frame, SOCKS-ON-BEFORE-SHOES-ON. Similarly, a relaxation of the sequence requirement, on the RHS, may be specified through the use of generalized frames. For example, STEP-LEFT-FOOT, then STEP-RIGHT-FOOT may be replaced by STEP-FOOT.

Situational frames are marked with a "#" on the LHS to indicate that the order of those so marked must be in the relative order specified (i.e., at least two # frames for effect). Action frames are marked with a "#" on the RHS to indicate that the relative order of those so marked is not constrained (i.e., at least two # frames for effect). A transform {Fj:, Fi:} matches {# Fi, # Fj}. Similarly, a transform (Fj:, Fi:) matches (# Fi, # Fj). The "#"s are immutable as this is case-specific information (e.g., a sequence for assembly may not match a sequence for disassembly), carried by the context. A sample case pairing follows.

| C9:<br>{#F1: a<br>#F2: b}<br>→<br>(F3: c<br>F4: d) | C10:<br>{F2: b<br>F1: a}<br>→<br>(#F3: c<br>#F4: f) |

These cases induce the non-deterministic case transform:
T7 [C9, C10]: (F3:c F4:d)↔(# F3:c # F4S)|{F1: a, F2: b}
Notice that this transform can reverse the order of RHS frames, while changing the phrase supplied to F4 from d to f, or vice versa.
Similarly, the case pairing:

| C11:<br>{#F1: a<br>#F2: b}<br>→<br>(F3: c<br>F4: d) | C12:<br>{F2: b<br>F1: a}<br>→<br>(#F4: d<br>#F3: c) | induces the case transform:
T8 [C11, C12]: {# F1:a, # F2:b}↔{F2:b, F1:a}|(# F3: c # F4: d)
Notice that this transform can reverse the order of LHS frames, or serve as a generalized id transform. RHS and LHS transformations may co-occur, where the most frequently synthesized conformant cases are selected for firing.

A transformational protocol is necessary to insure that all realizations function in an identical manner. This is best defined, for the programmer, by way of examples.

Given: {A, B, C, D}, transform {A, D} to {E}, yields {E, B, C}
Given: {# A, # B, C, # D}, transform {# B, # D} to {# F, # E}, yields {# A, # F, C, # E}
Given: {# A, # B, C, # D}, transform {# A, # D} to {# E, # F, # G},yields {# E, # B, C, # F, # G}
Given (A, B, C, D), transform (A, D) to (E), yields (E B C)
Given (# A # B C # D), transform (# B # D) to (# F # E), yields (# A # F C # E)
Given (# A # B C # D), transform (# A # D) to (# E # F # G), yields (# E # B C # F # G)

To continue, here is a simple example of naval wartime knowledge expressed in the form of stochastic cases. Transformations are made within context as scale is impossible to simulate in this example:
C1 (basis or n-step induced):
Situation:
{
Occupation: Marines holding enemy-occupied island
Terrain: Many large boulders on island
Situation: Marines under attack by enemy bombers
Situation: Marines under attack by machine gun fire from enemy fortifications
Situation: Marines under attack by enemy mortars
CASREP: Marine casualties high
Ammo: Marine ammunition low
Rockets: Marine rockets medium
Reinforcements: 3-5 hours out
}

Action (p=0.4):
(
Quick Action: Move for cover
Psyops: Create decoys
Rifle Instructions: Fire to suppress enemy fire
Rocket Instructions: Random fire rockets at enemy fortifications
)
Predicted Success: 88%
Predicted (Relative) Validity: 99%
C1 is a basis (i.e., user-supplied) case. n-step includes LHS+RHS transformations. The stochastic probability of this non deterministic case is 0.4. The rifle and rocket instructions may be issued at any time relative to the other instructions embodied by this case. The order of Quick Action and Psyops is immutable.

Next, second and third similar cases are supplied in preparation to illustrate the induction of LHS and RHS transformations. Thus, let
C2 (basis or n-step induced):
Situation:
{
Occupation: Marines holding enemy-occupied building
Situation: Marines under attack by snipers
Situation: Marines under attack by machine gun fire from enemy placements
Reinforcements: less than 10 minutes out
Terrain: There are surrounding buildings
CASREP: Marine casualties medium
Ammo: Marine ammunition medium
Rockets: Marine rockets medium
}
Action (p=1.0):
(
Rocket Instructions: Random fire rockets at enemy fortifications
Quick Action: Move for cover
Psyops: Create decoys
Rifle Instructions: Fire to suppress enemy fire
)
Predicted Success: 95%
Predicted Validity: 99%
C2 is a basis case. This case is deterministic, since p=1.0. The rocket and rifle instructions may be issued at any time relative to the other instructions embodied by this case action. The order of Quick Action and Psyops is immutable.
C3 (basis or n-step induced):
Situation:
{
Reinforcements: 3-5 hours out
Occupation: Marines holding enemy-occupied island
Terrain: Many large boulders on island
Situation: Marines under attack by enemy bombers
Situation: Marines under attack by machine gun fire from enemy fortifications
Situation: Marines under attack by enemy mortars
CASREP: Marine casualties high
Ammo: Marine ammunition low
Rockets: Marine rockets medium
}
Action (p=0.6):
(
Action: Minimal movement for immediate cover
Action: Radio for air support
Mortar Instructions: Launch mortars at enemy fortifications

Rifle Instructions: Fire to suppress enemy fire
)
Predicted Success: 90%
Predicted Validity: 99%
C3 is a basis case. The stochastic probability of this non deterministic case is 0.6. The mortar and rifle instructions may be issued at any time relative to the other instructions embodied by this case. The order of Action instructions is immutable.

Next, a LHS and a RHS transformation case will be formed and acquired by the proper segments. Situations and actions may be logically stored to save space. The search for a LHS/RHS match is made within a segment upon the acquisition of a new case by the segment, the movement of a fired case within the segment, or when attempting to match a context. First, a LHS transformation (ST1) is given:
C1.LHS↔C2.LHS|C1 RHS=C2 RHS:
ST1:
Situation C1:
{
Occupation: Marines holding enemy-occupied island
Terrain: Many large boulders on island
Situation: Marines under attack by enemy bombers
Situation: Marines under attack by machine gun fire from enemy fortifications
Situation: Marines under attack by enemy mortars
CASREP: Marine casualties high
Ammo: Marine ammunition low
Rockets: Marine rockets medium
Reinforcements: 3-5 hours out
}
    ← →
Situation C2:
{
Occupation: Marines holding enemy-occupied building
Situation: Marines under attack by snipers
Marines under attack by machine gun fire from enemy placements
Reinforcements: less than 10 minutes out
Terrain: There are surrounding buildings
CASREP: Marine casualties medium
Ammo: Marine ammunition medium
Rockets: Marine rockets medium
}
in the context of:
Action min (0.4, 1.0)=0.4:
(
Quick Action: Move for cover
Psyops: Create decoys
Rifle Instructions: Fire to suppress enemy fire
Rocket Instructions: Random fire rockets at enemy fortifications
)
Predicted Success: min (88%, 95%)=88%
Predicted Validity: min (99%, 99%)=99%
This transform case is acquired by the segment(s) with which the RHS has a maximal normalized (i.e., for the number of entries in the segment) number of subsequences and super-sequences in common. A new segment is created if this intersection is empty, or below threshold. Referenced segments are logically moved to the head of a containing list. Unreferenced segments are subject to tail deletion.

Here, a new segment is created at the outset. Nevertheless, an example of a RHS, which is a subsequence of this one that adds three to the commonality count for the segment, which is divided by the total number of RHSs in the segment (i.e., normalized) to insure that the number of entries does not skew the result, may be given by:
Action 0:
(
Rifle Instructions: Fire to suppress enemy fire
Quick Action: Move for cover
Psyops: Create decoys
)
Then, the following situation may be pattern matched by the situation for C2 and transformed into the situation for C1. That is, for example:
Situation:
{
1. Occupation: Marines holding enemy-occupied building
2. Situation: Marines under attack by snipers
Air Support: Helicopter gunships
3. Situation: Marines under attack by machine gun fire from enemy placements
4. Reinforcements: less than 10 minutes out
5. Terrain: There are surrounding buildings
6. CASREP: Marine casualties medium
7. Ammo: Marine ammunition medium
8. Rockets: Marine rockets medium
}
is transformed into:
Situation:
{
1. Occupation: Marines holding enemy-occupied island
5. Terrain: Many large boulders on island
Air Support: Helicopter gunships
2. Situation: Marines under attack by enemy bombers
3. Situation: Marines under attack by machine gun fire from enemy fortifications
Situation: Marines under attack by enemy mortars
6. CASREP: Marine casualties high
7. Ammo: Marine ammunition low
8. Rockets: Marine rockets medium
4. Reinforcements: 3-5 hours out
}
with the associated
Action=0.4:
(
Quick Action: Move for cover
Psyops: Create decoys
Rifle Instructions: Fire to suppress enemy fire
)
Predicted Success=88%
Predicted Validity=99%
Frame names and their associated phrases are attempted to be matched as one descriptive entity. The above numbering scheme shows a candidate association. This association is not necessarily unique.

Next, a RHS transformation (AT1) is given:
C1.RHS↔C3.RHS|C1 LHS=C3 LHS:
AT 1:
Action C1 (p=0.4):
(
Quick Action: Move for cover
Psyops: Create decoys
Rifle Instructions: Fire to suppress enemy fire
Rocket Instructions: Random fire rockets at enemy fortifications)
)
Predicted Success: 88%
Predicted Validity: 99%
Action C3 (p=0.6):
( Action: Minimal movement for immediate cover
Action: Radio for air support
Mortar Instructions: Launch mortars at enemy fortifications
Rifle Instructions: Fire to suppress enemy fire
Predicted Success: 90%
Predicted Validity: 99%
in the context of:
Situation:
{
Reinforcements: 3-5 hours out
Occupation: Marines holding enemy-occupied island
Terrain: Many large boulders on island
Situation: Marines under attack by enemy bombers
Situation: Marines under attack by machine gun fire from enemy fortifications
Situation: Marines under attack by enemy mortars
CASREP: Marine casualties high
Ammo: Marine ammunition low
Rockets: Marine rockets medium
}
This transform case is acquired by the segment with which the LHS has a maximal normalized (i.e., for the number of entries in the segment) number of subsets and supersets in common. A new segment is created if this intersection is empty, or below threshold. Again, referenced segments are logically moved to the head of a containing list. Unreferenced segments are subject to tail deletion.

Here, a new segment is created, since this is a situation and situations and actions lie in distinct segments, by definition. An example of a LHS, which is a subset of this one that adds three to the commonality count for the segment, which is divided by the total number of LHSs in the segment (i.e., normalized) to insure that the number of entries does not skew the result, may be given by:
Situation:
{
CASREP: Marine casualties high
Ammo: Marine ammunition low
Rockets: Marine rockets medium
}

Next, let the following case be present in the assumedly single situational segment.
C4 (basis or n-step induced):
Situation:
{
Light: It is dark outside
Occupation: Marines holding enemy-occupied island
Terrain: Many large boulders on island
Situation: Marines under attack by enemy bombers
Situation: Marines under attack by machine gun fire from enemy fortifications
Situation: Marines under attack by enemy mortars
CASREP: Marine casualties high
Ammo: Marine ammunition low
Rockets: Marine rockets medium
Reinforcements: 3-5 hours out
}
Action (p=0.7):
(
Quick Action: Move for cover
Psyops: Create decoys
Rifle Instructions: Fire to suppress enemy fire
Mortar Instructions: Launch mortars at enemy fortifications
Rocket Instructions: Random fire rockets at enemy fortifications
)
Predicted Success: 92%
Predicted Validity: 99%
Now, suppose that the following is the supplied context.
{
Weather: It is raining
Light: It is dark outside
Occupation: Marines holding enemy-occupied building
Situation: Marines under attack by snipers
Situation: Marines under attack by machine gun fire from enemy placements
Reinforcements: less than 10 minutes out
Terrain: There are surrounding buildings
CASREP: Marine casualties medium
Ammo: Marine ammunition medium
Rockets: Marine rockets medium
}
Clearly, no case will be triggered. However, hill climbing followed by Type 0 search, until success or interrupt may enable a LHS transformation to result in an applicable case. Here, the RHS of ST1 is a subsequence of the RHS of C4. Moreover, the LHS of C1 is a subset of the LHS of C4. Thus, according to ST1, the LHS of C2 may be substituted for the portion of the LHS of C4 that matches the LHS of C1. The resulting candidate case, C5, follows.
C5 (n-step induced):
Situation:
{
Light: It is dark outside
Occupation: Marines holding enemy-occupied building
Situation: Marines under attack by snipers
Situation: Marines under attack by machine gun fire from enemy placements
Reinforcements: less than 10 minutes out
Terrain: There are surrounding buildings
CASREP: Marine casualties medium
Ammo: Marine ammunition medium
Rockets: Marine rockets medium
}
Action (p=0.7):
(
Quick Action: Move for cover
Psyops: Create decoys
Rifle Instructions: Fire to suppress enemy fire
Rocket Instructions: Random fire rockets at enemy fortifications
)
Predicted Success: 92%
Predicted Validity: 99%
Notice that the LHS of C5 is now covered by the context (i.e., a most-specific covering). A transformational search is conducted for the first transformed case to be covered. The case RHS is next adjudicated for validity. This can be through an oracle or relative frequency counts for the number of syntheses paths.

Suppose that the probability of C5's action being correct is below squelch. Then, a sequence of RHS transformation (s) (AT2 . . . ) is sought until one successive transformation brings C5 into validity. Here is one such RHS transformation for the sake of argument:
Ci.RHS↔Cj.RHS|Ci LHS=Cj LHS:
AT2:
Action Ci (p=0.7):
(
Quick Action: Move for cover Psyops: Create decoys
Rocket Instructions: Random fire rockets at enemy fortifications
Rifle Instructions: Fire to suppress enemy fire
)
Predicted Success: 92%
Predicted Validity: 99%
Action Cj (p=0.5):
(
Action: Minimal movement for immediate cover
Action: Radio for air support
Mortar Instructions: Launch mortars at enemy fortifications
Rifle Instructions: Fire to suppress enemy fire
Predicted Success: 88%
Predicted Validity: 99%
in the context of:
Situation:
{
Light: It is dark outside
Occupation: Marines holding enemy-occupied building
Situation: Marines under attack by snipers
Terrain: There are surrounding buildings
CASREP: Marine casualties medium
}
This LHS is a subset of the situation for C5. Also, the first action for AT2 is a subsequence of the action for C5. Thus, the second action for AT2 may be substituted for the matching first action in C5 with the result:
Action (p=0.7):
(
(Action: Minimal movement for immediate cover
Action: Radio for air support
Mortar Instructions: Launch mortars at enemy fortifications
Rifle Instructions: Fire to suppress enemy fire
)
Predicted Success: min (88%, 92%)=88%
Predicted Validity: min (99%, 99%)=99%
This case is covered by the context. Again, if the validity is below squelch, another synthesis (chain) is attempted until such relative validation and/or absolute validation is achieved or abandoned. Subsequences and their substitutions are always determinable.

A beneficial implementation of this methodology is to have intersection thresholds set for optimal creativity for the domain(s). The scalability of the methodology depends upon the use of parallel processing.

Figure 5:
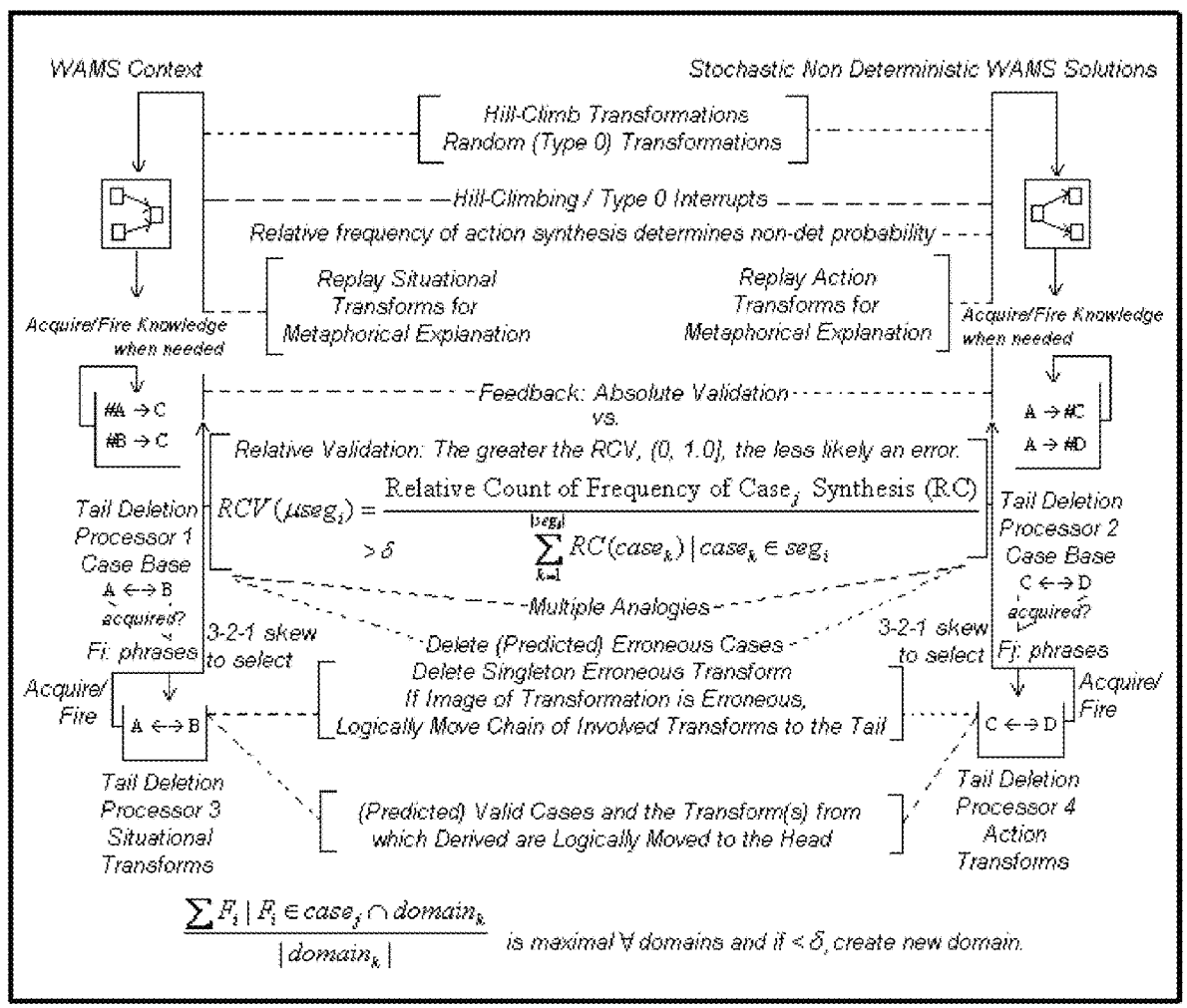
FIG. 5 shows a diagram illustrating a system of systems methodology for generalization in case-based reasoning.

To this point, the theory of dynamic representation, based on randomization, has been discussed and exemplified. However, when it comes to implementation, there are some simplifying assumptions, which can be made as follows. The embodied heuristics, which follow, derive from a corner point analysis of scalability and are noted. The resulting System of Systems methodology for randomization is depicted in diagram 400 shown in FIG. 5.

1. Case pairs of the form, A→C; B→C imply that situational pairs {A, B} may be substituted for one another without regard to the action context. Similarly, case pairs of the form, A→C; A→D imply that action pairs (C D) may be substituted for one another as non-deterministic actions— without regard to the situational context. This follows because the validity-insuring effect of context bears proportion to the specificity (i.e., length) of the transformation along with the specificity of the resident segment, which taken together imply domain specificity. Also, the greater the number of distinct paths by which a case situation and action pairing can be synthesized, the greater the likelihood of validity due to multiple analogies. Thus, the need for context checking and the associated computational cycles it steals tends to disappear with scale. Then, the fact that this is a heuristic method eliminates the need for such context altogether.

2. Situations and actions are given a frame format to facilitate pattern matching and segmentation as well as descriptive content to instantiate the frame and are of the form, Context-Free Category: context-sensitive phrase instance.

3. Situational and action transforms may be acquired whenever a novel case is acquired. They will be acquired at the logical list head of every segment, which is within tolerance of having a maximal number of situational and action frames in common (below). They are saved in distinct bases at the logical list head, where they are also moved to when feedback shows them to have been successfully fired. Every domain-specific case base is associated with a situational and action transform base. Each base may be assigned one or more processors. In practice, bases are determined by domain types, which are mapped by having a maximal number of dynamic sets of situational and action frame names in common.

$$\frac{\sum F_i \mid F_i \in case_j \cap domain_k}{|domain_k|}$$

is maximal $\forall$ domains and if $<\delta$, create a new domain, where $\delta \rightarrow 0^+$. Smaller values for delta are appropriate for domains where creativity is appropriate and error can be tolerated and vice versa.

4. Situational frames are marked with a "#" on the LHS to indicate that the sequence of those so marked must be in the relative order specified (i.e., at least two # frames for effect). Action frames are marked with a "#" on the RHS to indicate that the relative order of those so marked is not constrained (i.e., at least two # frames for effect).

5. Initially, hill-climb transformations (i.e., non-contracting transformations—getting closer to a situational match or the synthesis of an existing non deterministic action with each transformation). Such transformations may be made at random until a first interrupt is received. Upon failure, transformations are made in random order, until a second interrupt is received, to enable Type 0 generality. First interrupts translate into the time allowed to search for an emergency solution (e.g., a tiger is attacking); whereas, second interrupts translate into the time allowed to search for a cognitive solution (e.g., a proof of a novel theorem). Situational transformations are made to enable a match with the context. Action transformations are made to enable stochastic non deterministic selections. A count is maintained for the number of times a particular action is synthesized for a particular situation (i.e., a case). Dividing this number by the total number of actions synthesized for a particular situation yields the dynamic stochastic probability for a non-deterministic selection. Numeric overflow is prevented by normalizing (i.e., rounding) the ratio for the number of distinct non deterministic alternatives (i.e., the denominator). The alternative is deleted if this ratio goes to zero. These alternatives may be found in distinct segments.

$$non\,det\,prob(i,\ j) = situ_j \left| \frac{card\{action_i synthesis\}}{\sum_{k=1}^{|action_k|} card\{action_k synthesis\}} \right|$$

6. Cases already in the base are assumed to be valid until proven otherwise. The relative (i.e., predictive) validity of a case depends on the number of distinct paths for its derivation (i.e., multiple analogies). This number is approximated (with scale) by a relative count of the number of times a particular case is synthesized. Thus, using the 3-2-1 skew, cases synthesized from more recently acquired/fired cases are given a higher relative validity, since they are more likely to be repeatedly derived. This makes sense because these solutions are immediately needed and not just stored for possible future use, when validation is less error tolerant. The specificity (i.e., length) of transformation is not a factor because the system converges to eliminate erroneous transformations (i.e., at a minimum through absolute validity testing). A Relative Case Validity (RCV) is obtained by dividing the relative count by the sum of this number for all cases in the segment. The results for each containing segment are averaged, if a case may be present in more than one segment. It is good to have cases logically acquired by more than one segment if the intersection metric is within tolerance of the segment producing the maximum intersection value. This is because different segments will yield different analogies. If this tolerance is set too tightly, then too few analogies will be produced. Conversely, if it is set too loosely, then the associated processors will be slowed by comparison operations, which don't yield (valid) analogies. Segments may be linked and moved to the head when initiated or a case within them is fired. In that manner, segment storage may be reclaimed from segments that fall to the tail over time.

$$RCV(\mu seg_i) = \frac{\text{Relative Count of Frequency of Case}_j \text{ Synthesis}(RC)}{\sum_{k=1}^{|seg_i|} RC(case_k) \left| case_k \in seg_i \right.} > \delta$$

The greater the RCV, (0, 1.0], the more likely a case is to be valid. A domain-specific threshold may be set for RCV validation. Cases that are not validated are deleted. Absolute case validity is predicated on feedback as absolute validity is not necessarily provable. Case actions can modify the context through the use of a global blackboard mechanism. Case segments may communicate in this manner. Applicable segments are automatically discovered through parallel search without the need to specify any mnemonics. RCVs are multiplicative over chained case firings.

7. Validation is preferably absolute, but may also be relative using a domain-specific threshold depending on the specifics of the domain. Erroneous cases and single transforms from which they were derived are deleted. If a longer transformational chain was used to create the erroneous case, the involved transforms are logically moved-to-the-tail of their base in their order of application. Thus, these transforms will be among the first to fall off of their tails (i.e., tail deletion) when space is reclaimed as other transforms are logically moved-to-the-head of their base when acquired or fired and validated.

8. Validated cases and the transform(s) from which they were derived are logically moved-to-the-head of their base segment in their order of application. Thus, these cases and transform(s) will be more likely to be candidates in the solution of forthcoming problems because of temporal locality. Convergence upon correct cases, and thus correct transforms, and so on is assured.

9. A 3-2-1 skew may be used to select the order for the application of candidate situational as well as action transforms. Given the logical movement of acquired/fired transforms, a 3-2-1 skew insures that the order of candidate transformations in hill climbing, as well as in Type 0 searches, bears stochastic proportion to their currency of use. Thus, knowledge tends to be discovered where it is needed and in the time available—just in time discovery. Furthermore, cases and the applied sequence(s) of transformations provide a metaphorical explanation (i.e., via transformative cases) for the derivation of any symmetric knowledge.

10. This methodology is to be proven by supplying WAMS context, teaching it WAMS cases, supplying contexts for similar WAMS problems—correct actions for which have never been supplied, and seeing if the system converges on finding novel WAMS solutions. Such a result not only solves the long-standing generalization problem in CBR, but the context-based knowledge extension problem therein.

The acquisition of heuristic transformation cases determines new target cases, which iteratively determine new transformations. The greater the multiplicity of cases (including their non-deterministic alternatives) derived through transformation, the greater their individual reliabilities will be and vice versa (multiple analogies). The definition of a dynamic case transformative system provides for the inference of symmetric cases and transforms. Subsets, supersets, and Cauchy subsequences are used to effect a dynamic representation. Case segments may communicate through a global blackboard mechanism. Such segments are automatically searched in parallel by context without the need for named segments.

Although the methodology is self-referential, it is not subject to the limitations imposed by the Incompleteness Theorem. This is because it is inherently heuristic—not logical in nature. Also, cases are used in preference to rules so that their validity can be independently ascertained and generalized. This is more of a practical than theoretical concern. The methodology may be adapted for use in heuristic state-space search. It is also particularly well-suited to applications in natural language transformation (i.e., semantic understanding), where state-space search is limited due to its inability to frame the problem.

In theory, the only competing way to realize the results promised by the disclosed methodology is to apply knowledge to the inference of knowledge. A few approaches here have met with limited success. The problem is that the knowledge, which is self-referential, needs proper context for applicability. This context cannot be generated by the formal system itself due to limitations imposed by the Incompleteness Theorem. Rather, it must be externally supplied, which by definition necessarily makes it an incomplete set, or it must be heuristic in nature (e.g., multiple analogies) to avoid applicability of the Incompleteness Theorem. A multiple-analogies approach underpins this proposal. A theoretical consequence of this heuristic approach is that all non-trivial learning systems must embody an allowance for inherent error in that which may be learned. Thus, despite the seeming appeal of valid deduction systems (e.g., the predicate calculus and Japan's Fifth Generation project), they are inherently not scalable. Many entities require scalable learning systems (e.g., to support strategic and tactical decision-making) as a prerequisite to any financial investment in them.

The performance of a system incorporating embodiments of the disclosed methodology will be rated as a function of scale. It will be shown that the inferential error rate is inversely proportional to scale. That is, the larger the domain-specific case bases and the more processing power/time allocated, the lower the inherent inferential error rate.

The value of a successful experiment is that as a result, scalable intelligent systems will be able to learn outside the bounds of deductive logics—in the same manner as we humans learn. Moreover, the inference engine allows for modus ponens, which is something neural nets can never do. Furthermore, learning by neural nets, genetic algorithms, and scaled-up logics is NP-hard. The heuristic learning enabled herein is not only polynomial time, but is not subject to incompleteness.

Benefits and advantages of the embodiments of the disclosed system and method include, but are not necessarily limited to:

a. The invention equates case situations to find action transforms.
b. The invention equates case actions to find situation transforms.
c. The invention maintains cases, situation transforms, and action transforms in distinct bases.
d. All bases, in the invention, are segmented by common situational and action features.
e. Cases are (logically) acquired by all segments within tolerance of the segment having maximal intersection with its features. This insures diversity in the analogy formation process.
f. If a case is found to be erroneous and the result of a single transform, then both are deleted.
g. If a case is found to be erroneous and the result of multiple transforms in sequence, then the case is deleted and the transforms are logically moved to the tail of their resident lists.
h. (Predicted) valid cases and the transforms from which they are derived are moved to the logical head of their resident lists.
i. The segment containing an acquired/fired case is moved to the logical head of its containing list.
j. The tail of such logical lists is subject to garbage collection, where space and time is at a premium.
k. The relative validity of a case is determined by the number of paths by which it can be derived. They are deleted if below threshold.
l. Absolute validation provides important feedback when available, but is not always available in keeping with the results of the Incompleteness Theorem.
m. Situational transformation cases alter case situations in an attempt to obtain a covering by the context.
n. Action transformation cases create non deterministic alternative actions.
o. The probability of non-deterministic actions is directly proportion to the frequency of their synthesis. They are deleted if below threshold.
p. Transformation occurs when the system is otherwise idle (napping), or during allocated available times (dreaming). The 3-2-1 skew is used to favor the most-recently acquired/fired cases and transforms. This, in turn, implies that new knowledge is most likely to be created where it is needed—just in time discovery.
q. The search for applicable transformations begins with hill climbing (i.e., each transformation must bring the intermediate result closer to a goal state) as this is the most rapid. However, such rapidity implies less novel solutions, if discovered. The occurrence of a first interrupt ends hill climbing.
r. The search for applicable transformations continues with Type 0 transformation (i.e., expanding and contracting). This can be slow, but is the best way to insure novel discovery given massive parallel processing. The occurrence of a second interrupt ends Type 0 transformation.
s. Segments may communicate through a blackboard mechanism.
t. A frame mechanism serves to enable segmentation and predicate definition.
u. A "#" serves to enforce a relative ordering on situations and relax a relative ordering on actions. This allows the need for sequence to be constraining (or not) in the definition of cases.
v. Relatively valid novel non deterministic cases insure a higher probability for the synthesis of relatively valid novel transforms. These, in turn, insure a higher probability for the synthesis of relatively valid novel non deterministic cases, and so on.
w. Situational and action transforms may be replayed for a metaphorical explanation, which provides important justification for synthesized symmetric cases.
x. The invention is scalable to almost any size given a sufficient number of processors.
y. A Wartime Associate for Military Strategy (WAMS) is a creative, self-contained, extensible decision support system, which provides commonsense reasoning for military battle management systems by way of embodying this invention.
z. The invention is able to keep a massive number of parallel processors busy doing efficient work.

Figure 6:
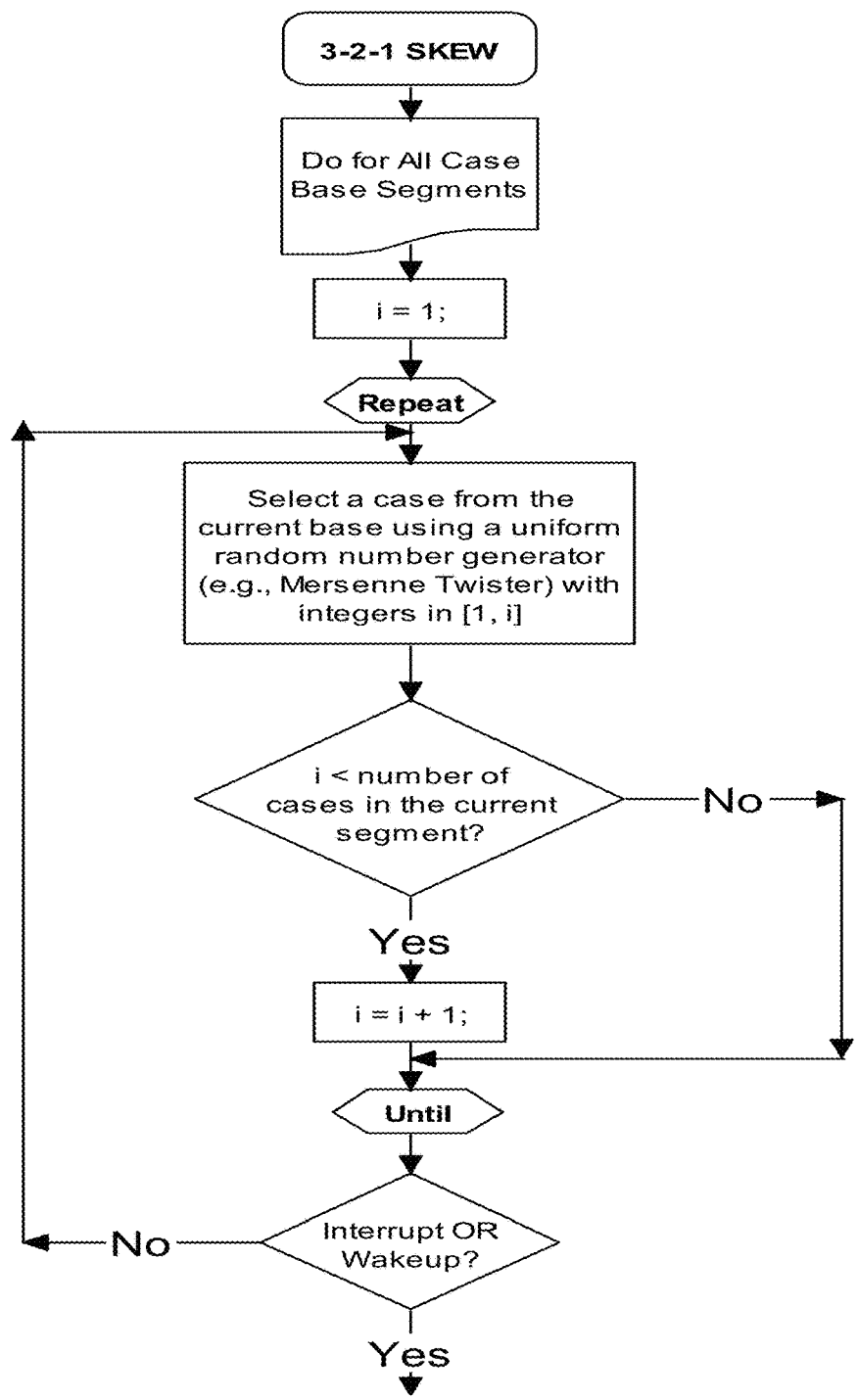
FIG. 6 shows a flowchart illustrating the 3-2-1 skew algorithm.

FIG. 6 shows a flowchart 500 illustrating the 3-2-1 skew. The 3-2-1 skew is a simple (fast) methodology for assigning knowledge relative weights on the basis of Denning's principle of temporal locality. More recent knowledge tends to be proportionately more valuable. This skew is used to increase the likelihood of solving a problem by taking full advantage of the current operational domain profile.

Knowledge is acquired at the logical head and moved there when fired. It is also expunged from the logical tail when necessary to release space. The selection of a particular skew is domain specific. For example, the rate of radioactive decay is known to be proportional to how much radioactive material is left (excluding the presence of certain metals). The nuclear decay equation may be used as a skew for various radioactive materials and is given by $A(t)=A_0 e^{-\lambda t}$. Here, $A(t)$ is the quantity of radioactive material at time t, and $A_0=A(0)$ is the initial quantity. $\lambda$ (lambda) is a positive number (i.e., the decay constant) defining the rate of decay for the particular radioactive material. A countably infinite number of other skews may be applicable. In the following assignment of skew-weights, the skew vector, S, favors the logical head of the case base in keeping with temporal locality. Cases, which were most-recently acquired or fired, and thus appear at or nearer to the logical head of a case-base, are proportionately more heavily weighted under the 3-2-1 skew. Of course, this differs from a uniform skew. The closer a case is to the top of its linked list, the greater its weight or importance. A heuristic scheme (i.e., the 3-2-1 skew) for achieving this with a dependency category consisting of d rules is to assign the head case a weight of $$\frac{2d}{d(d+1)}.$$

The map just below the head map has a weight of $$\frac{2(d-1)}{d(d+1)}.$$

Finally, the tail map of the segmented case base has a weight of $$\frac{2}{d(d+1)}.$$

The ith map from the head has a weight of $$\frac{2(d-i+1)}{d(d+1)},$$

for i=1, 2, . . . , d. For example, using a vector of four weights, the 3-2-1 skew (S) is S=(0.4, 0.3, 0.2, 0.1)$^T$. There are a countably infinite number of possible skews, such that $\Sigma s_k$=1.0.

The evaluation of the members of a dependency category is the contiguous weighted sum of its constituent elements. A 3-2-1 skew is defined where the ith map from the head has a weight of $$\frac{2(d-i+1)}{d(d+1)},$$

for i=1, 2, . . . , d; where, d specifies the number of terms in the skew. The use of the 3-2-1 skew is optional (i.e., in comparison with uniform weighting) and is useful for domains where the value of the data deteriorates in linear proportion to its time of collection—valuing more recent data, more highly. The use of additional time-dependent weights, depending on whether there is an additional time dependency of the value of the knowledge, is also possible.

Figure 7:
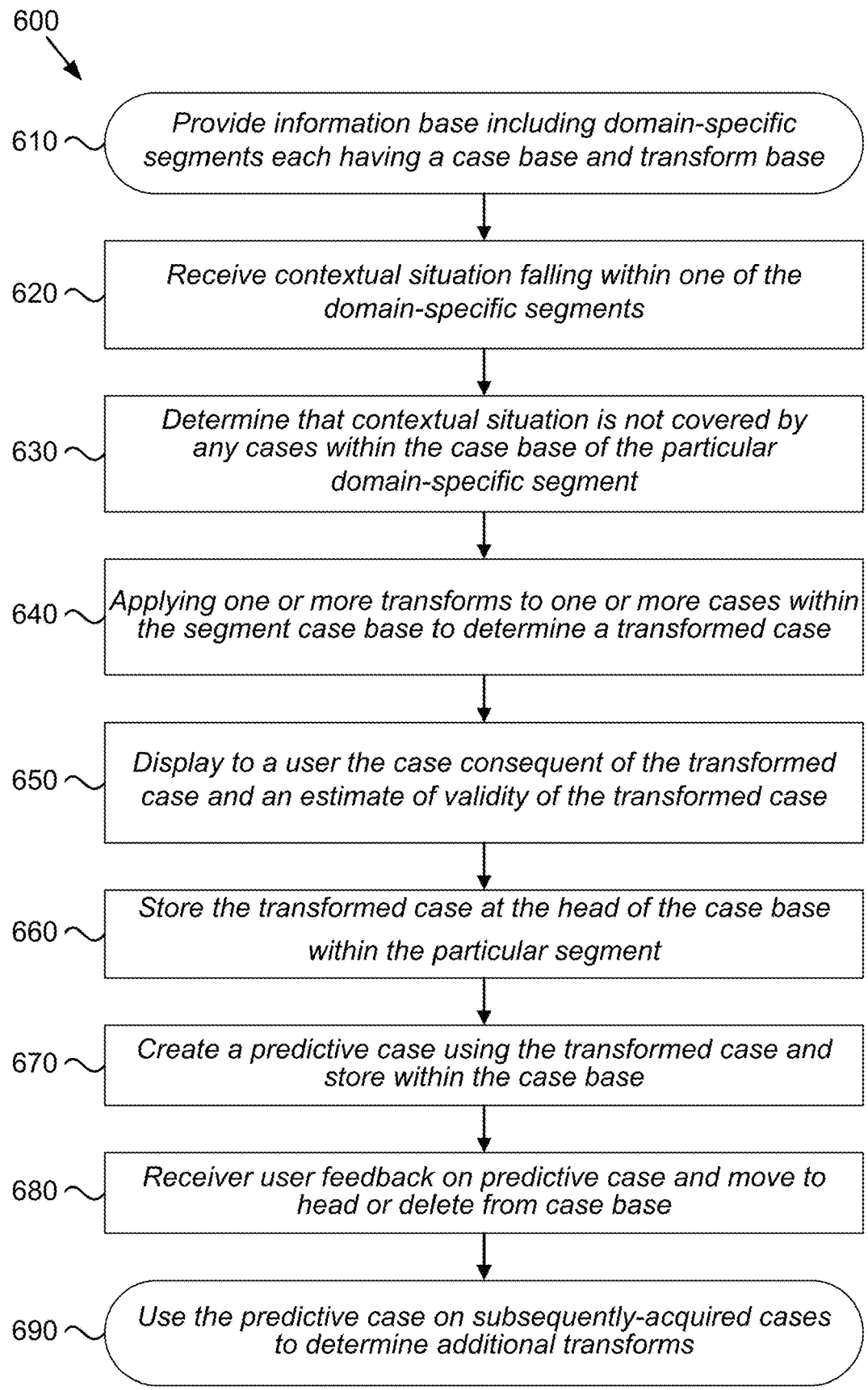
FIG. 7 shows a flowchart of an embodiment of a method in accordance with the Randomization Via Dynamic Representation and Informed Search.

FIG. 7 shows flowchart of an embodiment of a method 600 in accordance with the Randomization Via Dynamic Representation and Informed Search. Some or all of the steps of method 600 may be performed by a computer having one or more distributed processing devices connected thereto, such as computer 200 shown in FIG. 3 or system 100 shown in FIG. 2. Further, while FIG. 7 shows one embodiment of method 600 including steps 610-690, other embodiments of method 600 may contain fewer steps or more steps. Further, while in some embodiments the steps of method 600 may be performed as shown in FIG. 7, in other embodiments the steps may be performed in a different order, or certain steps may occur simultaneously with one or more other steps.

Method 600 may begin at step 610, which involves providing a case based system, such as system 100, comprising a plurality of domain-specific segments. Each domain-specific segment may be contained within one of a plurality of processors, such as processors 120, 130, and 140. However, in some embodiments, the domain-specific segments may all be contained within one processor. Each domain-specific segment comprises a case base, such as case bases 122, 132, and 142, having one or more cases therein and a transform base, such as transform bases 124, 134, and 144, having one or more transforms therein. Each case comprises a case antecedent and a case consequent. One or more of the cases are associated with one or more of the transforms within its domain-specific segment.

Step 620 involves receiving a contextual situation falling within one of the domain-specific segments. Using the sports injury domain example mentioned above, an example of a contextual situation falling within the baseball domain-specific segment may be that a pitcher has thrown 50 or more pitches in a game for two consecutive nights and the manager is contemplating using the pitcher in a game for a third consecutive night. Step 630 involves determining that the received contextual situation does not match the case antecedent of any of the cases within the particular domain-specific segment. The determination may be made by comparing the contextual situation with the case antecedents in the particular case base and determining that no exact match exists between the situation and the antecedents.

Method 600 then proceeds to step 640, which involves applying one or more transforms to one or more cases within the domain-specific segment of the contextual situation to create a transformed case. The term "transform" may refer to a function or other operator used for mapping some information to other information, such as case antecedents to other antecedents or contextual situation information to other information, with the application of the transforms highlighted in the examples provided above. In some embodiments, the transforms comprise situational transforms, action transforms, or a combination of both situational transforms and action transforms. The situational transforms are applied to the case antecedents and the action transforms are applied to the case consequents. The transformed case has a case antecedent that matches the contextual situation and further includes a case consequent.

In some embodiments, more than one transforms are applied to the case and a 3-2-1 skew is used to determine the order of application of transforms. In some embodiments, the one or more transforms applied to the case include a newly-created transform. In some embodiments, the newly-created transform is created using one or more pre-existing transforms from the transform base, as is shown in the examples above.

Step 650 involves displaying the case consequent of the transformed case to a user, such as via display 116. In some embodiments, step 650 further includes displaying an estimate of the validity of the transformed case to the user, such as the RCV percentage illustrated in the description above. Step 660 involves storing the transformed case at the head of the case base within the domain-specific segment of the contextual situation. Step 670 involves creating a predictive case using the transformed case and storing the predictive case within the case base. As an example, a predictive case is a case that is determined by the case-based system, but has not yet been validated by a user of the case-based system, with examples described above.

Step 680 involves receiving user feedback on the predictive case and either moving the predictive case to the head of the case base if the feedback indicates the predictive case is correct or deleting the predictive case from the case base if the feedback indicates that the predictive case is incorrect. Step 690 involves using the predictive case on subsequently-acquired cases in the case base to acquire additional transforms. In this step, the predictive case would be used by the case-based system in the same way as other cases within the case base, as described and shown in the examples above. In some embodiments, the one or more additional transforms are acquired at the head of the transform base. In some embodiments, the additional transforms are not acquired at the head of the transform base and are only moved to the head once they are validated by a user of the case-based system.

Some or all of the steps of method 600 may be stored on a non-transitory computer readable storage medium, wherein the steps are represented by computer readable programming code. The steps of method 600 may also be computer-implemented using a programmable device, such as a computer-based system. Method 600 may comprise instructions that, when loaded into a computer-based system, cause the system to execute the steps of method 600. Method 600 may be implemented using various programming languages, such as "Java", "C", or "C++".

Various storage media, such as magnetic computer disks, optical disks, and electronic memories, as well as computer readable media and computer program products, can be prepared that can contain information that can direct a device, such as a micro-controller, to implement the above-described systems and/or methods. Once an appropriate device has access to the information and programs contained on the storage media, the storage media can provide the information and programs to the device, enabling the device to perform the above-described systems and/or methods.

For example, if a computer disk containing appropriate materials, such as a source file, an object file, or an executable file, were provided to a computer, the computer could receive the information, appropriately configure itself, and perform the functions of the various systems and methods outlined in the diagrams and flowcharts above to implement the various functions. That is, the computer could receive various portions of information from the disk relating to different elements of the above-described systems and/or methods, implement the individual systems and/or methods, and coordinate the functions of the individual systems and/or methods. The language used in the specification has been principally selected for readability and instructional purposes, and may not have been selected to delineate or circumscribe the inventive subject matter. Accordingly, the disclosure of the inventive subject matter is intended to be illustrative, but not limiting, of the scope of the invention, which is set forth in the following claims.

Further, many modifications and variations of the embodiments disclosed herein are possible in light of the above description. Within the scope of the appended claims, the disclosed embodiments may be practiced otherwise than as specifically described. Further, the scope of the claims is not limited to the implementations and embodiments disclosed herein, but extends to other implementations and embodiments as may be contemplated by those having ordinary skill in the art.

I claim:

1. A method comprising:
   providing a case-based system comprising a plurality of domain-specific segments, wherein each domain-specific segment is contained within one of a plurality of distributed processors of the case-based system, wherein each domain-specific segment comprises a case base having one or more cases therein and a transform base having one or more transforms therein, wherein each case comprises a case antecedent and a case consequent, wherein one or more of the cases are associated with one or more of the transforms within its domain-specific segment, and wherein new transforms are acquired by acquiring new cases;
   receiving a contextual situation falling within a particular domain-specific segment of the plurality of domain-specific segments;
   determining that the received contextual situation does not match the case antecedent of any of the cases within the particular domain-specific segment;
   applying one or more transforms to one or more cases within the particular domain-specific segment of the contextual situation to create one or more transformed cases, wherein each of the one or more transformed cases comprises a transformed case antecedent that matches both the contextual situation and a transformed case consequent;
   segmenting and logically ordering the one or more transformed cases to facilitate pattern matching and to determine a relative time of last use;
   displaying the transformed case consequent of each of the one or more transformed cases to a user;
   twice storing each of the one or more transformed cases at the head of the case base within the particular domain-specific segment of the contextual situation; and
   caching the cases and the transforms, thereby maximizing their retrieval speed.

2. The method of claim 1, wherein more than one transforms are applied to the case, and wherein a 3-2-1 skew is used to determine the order of application of transforms.

3. The method of claim 1, wherein the transforms comprise situational transforms and action transforms, and wherein the situational transforms are applied to the case antecedents and the action transforms are applied to the case consequents.

4. The method of claim 1, further comprising:
   creating a predictive case using the transformed case; and
   storing the predictive case in the case base.

5. The method of claim 4, further comprising:
   receiving user feedback that the predictive case is correct; and
   moving the predictive case to the head of the case base.

6. The method of claim 4, further comprising using the predictive case on subsequently acquired cases within the case base to determine one or more additional transforms.

7. The method of claim 6, further comprising moving the one or more additional transforms to the head of the transform base.

8. The method of claim 4, further comprising:
   receiving user feedback that the predictive case is incorrect; and
   deleting the predictive case from the case base.

9. The method of claim 1, wherein the one or more transforms applied to the case comprise a newly-created transform.

10. The method of claim 9, wherein the newly-created transform is created by using one or more pre-existing transforms from the transform base.

11. The method of claim 1, further comprising displaying an estimate of case validity for the transformed case.

12. A method comprising:
    providing a case based system comprising a plurality of domain-specific segments, wherein each domain-specific segment is contained within one of a plurality of distributed processors of the case-based system, wherein each domain-specific segment comprises a case base having one or more cases therein and a transform base having one or more transforms therein, wherein each case comprises a case antecedent and a case consequent, wherein one or more of the cases are associated with one or more of the transforms within its domain-specific segment, and wherein new transforms are acquired by acquiring new cases;

receiving a contextual situation falling within a particular domain-specific segment of the plurality of domain-specific segments;

determining that the received contextual situation does not match the case antecedent of any of the cases within the particular domain-specific segment;

applying more than one transforms to one or more cases within the particular domain-specific segment of the contextual situation to create one or more transformed cases, wherein the transforms comprise situational transforms and action transforms, wherein the situational transforms are applied to the case antecedents and the action transforms are applied to the case consequents, wherein each of the one or more transformed cases comprises a transformed case antecedent that matches both the contextual situation and a transformed case consequent, and wherein a 3-2-1 skew is used to determine the order of application of transforms;

segmenting and logically ordering the one or more transformed cases to facilitate pattern matching and to determine a relative time of last use;

displaying the transformed case consequent of each of the one or more transformed cases and an estimate of the validity of the transformed case to a user;

twice storing each of the one or more transformed cases at the head of the case base within the particular domain-specific segment of the contextual situation;

creating a predictive case using the transformed case;

storing the predictive case in the case base; and caching the cases and the transforms, thereby maximizing their retrieval speed.

13. The method of claim 12, further comprising:
receiving user feedback that the predictive case is correct; and
moving the predictive case to the head of the case base.

14. The method of claim 12, further comprising:
using the predictive case on subsequently acquired cases within the case base to determine one or more additional transforms; and
moving the one or more additional transforms to the head of the transform base.

15. The method of claim 12, further comprising:
receiving user feedback that the predictive case is incorrect; and
deleting the predictive case from the case base.

16. The method of claim 12, wherein the one or more transforms applied to the case comprise a newly-created transform, and wherein the newly-created transform is created by using one or more pre-existing transforms from the transform base.

17. A system comprising:
a computer having a computer input device and a display device connected thereto; and
a case based system comprising a plurality of distributed processors communicatively coupled to the computer, the case base system comprising a plurality of domain-specific segments, wherein each of the distributed processors represents one of the domain-specific segments, wherein the computer is configured to coordinate the activities of the distributed processors, wherein each of the distributed processors is configured to maintain at least one of a case base having one or more cases therein and a transform base having one or more transforms therein, wherein each case comprises a case antecedent and a case consequent, wherein one or more of the cases are associated with one or more of the transforms within its domain-specific segment, and wherein new transforms are acquired by acquiring new cases, each of the plurality of distributed processors configured to:

receive a contextual situation falling within a particular domain-specific segment of the plurality of domain-specific segments;

determine that the received contextual situation does not match the case antecedent of any of the cases within the particular domain-specific segment, apply one or more transforms to one or more cases within the particular domain-specific segment of the contextual situation to create one or more transformed cases, wherein each of the one or more transformed cases comprises a transformed case antecedent that matches both the contextual situation and a transformed case consequent;

segment and logically order the one or more transformed cases to facilitate pattern matching and to determine a relative time of last use;

display the transformed case consequent of each of the one or more transformed cases and an estimate of the validity thereof to a user, twice store each of the one or more transformed cases at the head of the case base within the particular domain-specific segment of the contextual situation; and cache the cases and the transforms, whereby their retrieval speed is maximized.

18. The system of claim 17, wherein the transforms comprise situational transforms and action transforms, and wherein the distributed processors are configured to apply the situational transforms to the case antecedents and apply the action transforms to the case consequents.

19. The system of claim 17, wherein the distributed processors are further configured to:
creating a predictive case using the transformed case;
receiving user feedback that the predictive case is correct; and
storing the predictive case at the head of the case base.

20. The system of claim 17, wherein the distributed processors are further configured to:
creating a predictive case using the transformed case;
using the predictive case on subsequently acquired cases within the case base to determine one or more additional transforms; and
moving the one or more additional transforms to the head of the transform base.

* * * * *